United States Patent
Whear et al.

(10) Patent No.: US 12,230,769 B2
(45) Date of Patent: Feb. 18, 2025

(54) FUNCTIONALIZED LEAD ACID BATTERY SEPARATORS, IMPROVED LEAD ACID BATTERIES, AND RELATED METHODS

(71) Applicant: Daramic, LLC, Charlotte, NC (US)

(72) Inventors: J. Kevin Whear, Utica, KY (US); Ahila Krishnamoorthy, Karnataka (IN); Susmitha Appikatla, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 327 days.

(21) Appl. No.: 17/588,321

(22) Filed: Jan. 30, 2022

(65) Prior Publication Data

US 2022/0158303 A1 May 19, 2022

Related U.S. Application Data

(62) Division of application No. 16/543,727, filed on Aug. 19, 2019, now Pat. No. 11,271,270, which is a (Continued)

(51) Int. Cl.
*H01M 10/12* (2006.01)
*H01M 50/403* (2021.01)
(Continued)

(52) U.S. Cl.
CPC ......... *H01M 10/12* (2013.01); *H01M 50/403* (2021.01); *H01M 50/431* (2021.01);
(Continued)

(58) Field of Classification Search
None
See application file for complete search history.

(56) References Cited

U.S. PATENT DOCUMENTS

| 5,633,081 A | 5/1997 | Clough et al. |
| 6,703,161 B2 | 3/2004 | Zucker |

(Continued)

FOREIGN PATENT DOCUMENTS

WO  WO2016210225  12/2016

*Primary Examiner* — Carlos Barcena
(74) *Attorney, Agent, or Firm* — Hammer & Associates, P.C.

(57) ABSTRACT

In accordance with at least selected embodiments, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments, the present application is directed to novel or improved porous membranes having a coating layer, battery separator membranes having a coating layer, separators, energy storage devices, batteries, including lead acid batteries including such separators, methods of making such membranes, separators, and/or batteries, and/or methods of using such membranes, separators and/or batteries. The disclosed separators and/or batteries have improved charge acceptance, improved surface conductivity, improved oxidation resistance, reduced acid stratification, improved resistance to metal contamination induced oxidation, reduced black residue, improved wettability, and/or improved stiffness.

16 Claims, 7 Drawing Sheets

Related U.S. Application Data division of application No. 15/286,032, filed on Oct. 5, 2016, now Pat. No. 10,388,931.

(60) Provisional application No. 62/237,174, filed on Oct. 5, 2015.

(51) Int. Cl.
*H01M 50/431* (2021.01)
*H01M 50/434* (2021.01)
*H01M 50/437* (2021.01)
*H01M 50/44* (2021.01)
*H01M 50/446* (2021.01)
*H01M 50/451* (2021.01)
*H01M 50/454* (2021.01)
*H01M 50/457* (2021.01)
*H01M 50/489* (2021.01)

(52) U.S. Cl.
CPC ....... *H01M 50/434* (2021.01); *H01M 50/437* (2021.01); *H01M 50/44* (2021.01); *H01M 50/446* (2021.01); *H01M 50/451* (2021.01); *H01M 50/454* (2021.01); *H01M 50/457* (2021.01); *H01M 50/489* (2021.01)

(56) References Cited

U.S. PATENT DOCUMENTS

| | | |
|---|---|---|
| 9,190,648 B2 | 11/2015 | Whear |
| 9,263,720 B2 | 2/2016 | Timmons |
| 9,461,291 B2 | 10/2016 | Miller et al. |
| 9,508,976 B2 | 11/2016 | Herle |
| 2001/0005560 A1 | 6/2001 | Yoshida et al. |
| 2005/0245653 A1 | 11/2005 | Whear et al. |
| 2006/0121269 A1 | 6/2006 | Miller et al. |
| 2006/0141350 A1 | 7/2006 | Dreyer et al. |
| 2008/0076028 A1 | 3/2008 | Miller et al. |
| 2008/0241686 A1 | 10/2008 | Sugie et al. |
| 2012/0208070 A1 | 8/2012 | Nakashima et al. |
| 2013/0273409 A1 | 10/2013 | Nandi et al. |
| 2015/0171398 A1 | 6/2015 | Roumi |

| BASE FILM OR SUBSTRATE | LAYERING MATERIAL | METHOD OF DEPOSITION |
|---|---|---|
| ANY POLYMERIC SEPARATOR (PE, PVC, RUBBER, CELLULOSE) | DIELECTRIC LAYER LIKE SILICA, ALUMINA, etc. | (SOL-GEL COATING METHODS) SUCH AS SPIN COATING, ROLLER COATING, SPRAY COATING, INKJET PRINTING OF LIQUID THAT CAN BE DRIED OR CURED AFTER FILM FORMATION |
| ANY POLYMERIC SEPARATOR (PE, PVC, RUBBER, CELLULOSE) | DIELECTRIC LAYER LIKE SILICA, ALUMINA, etc. | PHYSICAL VAPOR DEPOSITION. HITTING A METAL TARGET WITH AN ION PLASM TO RELEASE ATOMS OF METAL WHICH GETS DEPOSITED ON THE SUBSTRATE THROUGH "LINE OF SIGHT MECHANISM". LAYER FORMS WHEREVER THE ATOMS CAN SEE. THERE WILL BE SHADOW EFFECT WHERE THE LAYER WILL COME ONLY ON ONE SIDE OF THE RIB BECAUSE THE OTHER SIDE CANNOT BE SEEN BY ATOMS. TO CIRCUMVENT THIS, THE SUBSTRATE IS PLACED ON CARRIER THAT ROTATES. LINE OF SIGHT COULD BE DISIRABLE WHEN ATOMS DEPOSIT ON THE FLAT TOP SURFACE OF RIB AND BETWEEN THE RIBS ON THE BACKWEB... THESE ARE THE AREAS THAT MAY GET PUSHED AGAINST THE POSITIVE PLATE THAT NEED PROTECTION AGAINST OXIDATION. MANY METALLIC ELEMENTS CAN BE DEPOSITED BY THIS METHOD |
| ANY POLYMERIC SEPARATOR (PE, PVC, RUBBER, CELLULOSE) | DIELECTRIC LAYER LIKE SILICA, ALUMINA, etc. | FORMED BY CHEMICAL VAPOR DESPOSITION. USE OF SPECIAL PRECURSORS THAT WILL DECOMPOSE AT THE SURFACE OF SUBSTRATE AND FORM OXIDE LAYERS. OR ONE CAN ENVISION SPUTTERING OF Al FROM A METAL TARGET USING AN ION BEAM (SAY AR ION PLASMA) AND REACTING WITH ENVIRONMENT SAY WATER, OR OXYGEN TO FORM ALUMINA ON THE SURFACE OF SUBSTRATES |
| ANY POLYMERIC SEPARATOR (PE, PVC, RUBBER, CELLULOSE) | DIELECTRIC LAYER LIKE SILICA, ALUMINA, etc. | FORMED BY ATOMIC LAYER DEPOSITION - CAREFUL LAYER BY LAYER DEPOSITION PF NEEDED ELEMENTS. FOR EXAMPLE FIRST ATOMIC LAYER CAN BE Si AND REACTIVE GAS CAN BE FLOWN TO CONVERT IT TO $SiO_2$ AND THEN NEXT LAYER OF Si CAN BE LAID OUT. HIGH LEVEL OF UNIFORMITY CAN BE ACHIEVED |
| ANY POLYMERIC SEPARATOR (PE, PVC, RUBBER, CELLULOSE) | DIELECTRIC LAYER LIKE SILICA, ALUMINA, etc. | INKJET PRINTING OR ANY LOCALIZED DEPOSITION METHODS CAN BE USED TO LAY OUT ONLY ON THE RIB WHICH IS IN CONTACT WITH POSITIVE PLATE AND HAS MORE PROSPENSITY TO OXIDIZE |
| ANY POLYMERIC SEPARATOR (PE, PVC, RUBBER, CELLULOSE) | METALLIC LAYERS | PVD, CVD |
| ANY POLYMERIC SEPARATOR (PE, PVC, RUBBER, CELLULOSE) | CARBON COULD BE GRAPHENE, GRAPHITE, CONDUCTIVE CARBON ALLOTROPES, COMBINATION OF ALLOTROPES, CARBON NANOTUBES...etc. | CHEMICAL VAPOR DEPOSITION, SOL-GEL COATING (SPRAY, DIP, SPIN, ROLLER, DOCTOR BLADE, GRAVURE, ETC...), COULD ALSO ENVISION DEPOSITING AN ORGANIC MOLECULE THAT IS CHARRED IN SULFURIC ACID POSSIBLY FORMING CARBON |
| ANY GLASSMAT, FIBERMAT, SYNTHETIC MAT, COMBINATION OF FIBER+SILICA MAT | CARBON AS ABOVE | AS ABOVE |
| POLYMER SEPARATOR, CELLULOSIC SEPARATOR, ETC. | COATING OF MICROFINE GLASS FIBER MIXED WITH CARBON OR MIXED WITH SILICA TO FORM A TOP LAYER OF CONDUCTIVE LAYER OR THAT WHICH RESISTS ACID STRATIFICATION (TO BEHAVE LIKE AGM) | ROLLER COATING, SPRAY, SPIN COATING, SOL-GEL COATING, INKJET, GRAVURE, etc. |
| POLYMER SEPARATOR OR CELLULOSIC FIBER MAT, GLASS MAT, ETC. | COATING OF MATERIALS THAT RESIST DIFFUSION OF IONS SUCH AS V, Cr, Mn, Sb, etc. | EXAMPLE COAT NAFLON TYPE MATERIALS ON TOP OF SEPERATOR. OXIDIZED POLYMER FILM SUCH AS PEO, OXIDIZED TEFLON BACKBONE WITH SULFONIC OR OTHER HIGHLY HYDROPHILLIC MATERIALS AS SIDE CHAINS. ONE CAN ENVISION HAVING COMPLEXING LIGANDS AS SIDE CHAINS TO LOCK ONTO METALLIC IONS TO PREVENT MIGRATION TO OPPOSITE SIDE OR DESTROYING SEPERATOR |

*FIG. 5A*

| DESIRED THICKNESS | ADVANTAGES |
|---|---|
| SEVERAL MICRONS (>1 μm) DILUTE COATING SOLUTION FORMS THIN FILMS | DIELECTRIC LAYER PROVIDE STIFFNESS, PUNCTURE RESISTANCE, SURFACE POROSITY PROVIDING REDUCED STRATIFICATION, BETTER OXIDATION RESISTANCE |
| >1 μm TO 20 μm FILMS ARE POSSIBLE. VERY THICK FILMS MAY CRACK DUE TO STRESS RELEASE. NEED ANNEALING TREATMENT AFTER RELEASING STRESS | SAME AS ABOVE |
| >1 μm TO 20 μm FILMS ARE POSSIBLE. VERY THICK FILMS MAY CRACK DUE TO STRESS RELEASE. NEED ANNEALING TREATMENT AFTER RELEASING STRESS | SAME AS ABOVE |
| USED FOR ULTRATHIN FILMS IN nm LEVELS | SAME AS ABOVE |
| POSSIBLE TO BUILD THICKNESS BY CHOOSING CONCENTRATED STARTING MATERIALS | SAME AS ABOVE |
| THIN FILMS OF SEVERAL MICRONS | INCREASE SURFACE CONDUCTIVITY, IMPROVE CURRENT DISTRIBUTION, REDUCE BARRIER TO ION DIFFUSION TO THE SURFACE OF SEPARATOR, etc. |
| THIN TO THICK FILMS (ONE MICRON TO SEVERAL MICRONS POSSIBLE) | THIN CONDUCTIVE FILMS SHOULD BE SUFFICIENT TO REDUCE CURRENT CROWDING, CURRENT DISTRIBUTION NONUNIFORMITY, IF POROUS MAY HAVE ADDED BENEFIT OF ACID STRATIFICATION, HIGHER CHARGE ACCEPTANCE, etc. |
| SAME AS ABOVE | HERE THE COATING HAS TO BE DONE ON MAT UPSIDE DOWN SO IT DOES NOT DIFFUSE INTO PORES FORMING CONDUCTIVE PATHS IN THE THROUGH-THICKNESS OF THE FILM INITIATING SHORTING. WHEN THE LIQUID COATING IS APPLIED USING A ROLLER ONTO A MAT THAT TRAVELS ON THE TANK JUST TOUCHING THE SURFACE... AND GRABS ONTO THE COATING ... AND QUICKLY HEATED AND DRIED TO STOP DIFFUSION INTO THE SUBSTRATE IS PROBABLY NECESSARY |
| SAME AS ABOVE | GLASS FIBER ON TOP PROVIDES OXIDATION RESISTANCE, STRATIFICATION RESISTANCE AND SO ON |
| A FEW MONOPLAYERS OR THICK FILMS OF SEVERAL MICRONS | NAFLON PREVENTS MIGRATION OF IONS THROUGH ITSELF. THIS CAN HELP TO PREVENT ANTIMONY POISONING OR Cr/Mn/Ni, etc. INDUCED OXIDATION OF SEPERATORS |

FIG. 5A CONT.

| BASE FILM OR SUBSTRATE | LAYERING MATERIAL | METHOD OF DEPOSITION | DESIRED THICKNESS | ADVANTAGES |
|---|---|---|---|---|
| PE, PVC, POLYMERIC, CELLULOSIC MAT, GLASS MAT, SYNTHETIC MAT, COMBINATIONS THEREOF | MULTILAYERS OF DIFFERENT MATERIALS: THE LAYERS CAN BE AS FOLLOWS FOR EXAMPLE: DIELECTRIC OVER INSULATOR OVER SEPERATOR OR MEATL OVER DIELECTRIC OVER SEPERATOR; OR TWO DIFFERENT METALS OR TWO DIFFERENT DIELECTRICS ON TOP OF SEPERATOR. COMBINATIONS TO FORM MULTILAYER DEPOSITED FILMS | COMBINATIONS OF METHODS. EXAMPLE 1: ONE CAN ENVISION DEPOSITING ALUMINA OVER ALUMINUM BY DEPOSITING FIRST SEVERAL MONOLAYERS ALUMINUM BY PVD ON SEPERATOR FOLLOWED BY DEPOSITING AL IN WATER OR OXYGEN ENVIRONMENT TO FORM ALUMINA TOP LAYERS. EXAMPLE 2: DEPOSIT ALUMINA FIRST ON TOP OF SEPERATE AND THEN DEPOSIT AN ALLOTROPE OF CARBON ON TOP BY CVD OR ROLLER COATING OR INKJET OR SPRAY | FROM 1 μm TO 10's OF MICRONS | COMBINATION OF PROPERTY SETS |
| PE, PVC, POLYMERIC, CELLULOSIC MAT, GLASS MAT, SYNTHETIC MAT, COMBINATIONS THEREOF | GRADIENT LAYERS: CHANGING COMPOSITION OF LAYERS FROM THE SURFACE OF SEPERATOR TOWARD THE TOP SURFACE OF DEPOSITED FILM-FOR EXAMPLE, ONE CAN HAVE HIGH CONCENTRATION OF CARBON (OR 100%) AS TOPMOST LAYER TO PROVIDE HIGH SURFACE CONDUCTIVITY AND CHANGE CONCENTRAION OF C IN SAY ANOTHER MATRIX MATERIAL SUCH AS SILICA OR ALUMINA IN THE INNER LAYER | DEPOSIT A MIXTURE OF SILICA AND CARBON ON TOP OF SEPERATOR BY SOL-GEL COATING (FOR EXAMPLE) AND THEN DEPOSIT PURE CARBON LAYER ON TOP OF IT BY ROLLER COATING OR SPRAY TO CREATE A CONCENTRAITON GRADIENT OF C FROM OUTSIDE TO INSIDE ON THE DEPOSITED LAYER | FROM 1 μm TO 10's OF MICRONS. THICKNESS OF EACH LAYER CAN BE VARIED AS NEEDED | COMBINATION OF PROPERTY SETS. GRADIENT FIMLS HAVE BETTER ADESION TO EACH OTHER THAN A PURE FILM (AS THE CONCENTRAION VARIES SLOWLY, THERE IS NO ABRUPT INTERFACE BETWEEN DIFFERENT LAYERS OF DEPOSITS) |
| PE, PVC, POLYMERIC, CELLULOSIC MAT, GLASS MAT, SYNTHETIC MAT, COMBINATIONS THEREOF | LAYERS MAY FACE EITHER POSITIVE PLATE OR NEGATIVE PLATE OR BOTH. THE SEPERATORS CAN BE COATED ON ONE SIDE OR BOTH SIDES WITH THE SAME MATERIAL OR DIFFERENT MATERIALS | COMBINATIONS OF METHODS TO COAT MATERIALS | FROM 1 μm TO 10's OF MICRONS. THICKNESS OF EACH LAYER CAN BE VARIED AS NEEDED | IMPROVED BATTERIES MADE WITH THESE COMBINATIONS TO PROVIDE IMPROVED PERFORMANCE SUCH AS HIGHER CHARGE ACCEPTANCE, CYCLE LIFE, AND SO ON |

FIG. 5B $C_S$ - CONCENTRATION AT THE SURFACE $C_I$ - CONCENTRATION AT THE INTERFACES BETWEEN SEPERATOR AND COATING $C_0$ - CONCETRATION BECOMES ZERO HERE

FUNCTIONALIZED LEAD ACID BATTERY SEPARATORS, IMPROVED LEAD ACID BATTERIES, AND RELATED METHODS

CROSS-REFERENCE TO RELATED APPLICATIONS

This application is a divisional application claiming priority to U.S. application Ser. No. 16/543,727, filed Aug. 19, 2019, which claims priority to and benefit of U.S. application Ser. No. 15/286,032, filed Oct. 5, 2016, and issued on Aug. 20, 2019 as U.S. Pat. No. 10,388,931, which claims priority to U.S. Provisional Patent Application Ser. No. 62/237,174, filed on Oct. 5, 2015. The entire contents of which are herein incorporated by reference.

FIELD

In accordance with at least selected embodiments, the present application or invention is directed to novel, improved or optimized porous films, membranes or substrates, functionalized, coated or treated porous films, membranes or substrates, novel, improved, optimized, functionalized, coated, or treated separator membranes, separators, multilayer separators, lead acid battery separators, or composites, electrochemical devices, batteries, or cells including such films, membranes, substrates, separator membranes, separators, lead acid battery separators, or composites, novel, improved or optimized combinations or systems of plates or electrodes with such films, membranes, substrates, separator membranes, separators, lead acid battery separators, or composites, methods of making such films, membranes, substrates, separator membranes, separators, lead acid battery separators, composites, systems, combinations, cells, devices, and/or batteries, and/or methods of using such films, membranes, substrates, separator membranes, separators, lead acid battery separators, composites, systems, combinations, cells, devices, and/or batteries. In accordance with at least certain embodiments, the present application is directed to novel, improved, or optimized, functionalized, coated, or treated microporous membranes, battery separator membranes, lead acid battery separator membranes, separators, and/or lead acid battery separators having at least one functionalized, coated, or treated surface on at least one side thereof, having at least one coating, film, layer, or material on at least one side, rib or surface thereof, energy storage devices, cells, systems, combinations, and/or batteries including such membranes, battery separator membranes, lead acid battery separator membranes, separators, and/or lead acid battery separators, methods of making such membranes, battery separator membranes, lead acid battery separator membranes, separators, and/or lead acid battery separators, and/or methods of using such membranes, battery separator membranes, lead acid battery separator membranes, separators, lead acid battery separators, composites, combinations, systems, devices, cells, and/or batteries, and/or the like.

BACKGROUND

Lead acid batteries have four basic components, a positive electrode, which may be a lead or lead alloy grid pasted with a lead oxide positive active material (PAM) coating, a negative electrode, which may be a lead or lead alloy grid pasted with a negative active material (NAM) coating, a separator, and a liquid electrolyte, generally sulfuric acid. To prevent physical contact between the electrodes of opposite polarity while allowing for ionic flow, electrically insulating porous separators are placed between the electrodes. Separators often include a microporous polymer membrane or material, for instance a polyolefin membrane, such as polyethylene (PE) membrane. In a lead acid battery, the area in which the electrolyte and positive electrode meet is called the interfacial "oxidation zone." The oxidation may be purely chemical or purely electrochemical or a combination of both. This oxidation zone is on the order of several hundred microns or μm and extends into the electrolyte where the separator is placed. Polyethylene and similar polymers are not inherently oxidation resistant during the battery operation, and as such may undergo accelerated oxidation, especially portions of the separator which are located in the oxidation zone. Oxidation of the separator material may lead to reduced battery performance and life span.

A typical separator will often surround either, or both, of the positive or negative electrodes, usually in an envelope, pocket or sleeve configuration. The envelope or sleeve is obtained from a single sheet of separator material which is folded into the shape necessary to surround the electrode. This folding and cutting is often done with automated equipment in a continuous fashion. Over time, automotive battery manufacturers have reduced the backweb thickness of separators from 250 μm to 150 μm, because reducing the volume of the separator allows additional electrolyte and electrode material to be present in the battery, increasing power and performance. However, because bending stiffness is related to the cube of the thickness, even small reductions in thickness can substantially reduce bending stiffness. For instance, a 30% reduction in thickness can result in a 70% decrease in bending stiffness. The reduced separator stiffness presents manufacturing challenges with existing equipment. For instance, reduced stiffness increases the propensity for inadvertent folds and creases, leading to higher rejection rates of the finished separator. Reducing manufacturing speed can reduce rejection rate, however, the productivity loss that accompanies such reduction is often commercially undesirable or infeasible.

When lead acid batteries are deeply discharged the gravity of the electrolyte will decrease as the sulfuric acid is a participant in the energy storage reactions. Upon recharging, pure sulfuric acid, which has higher density than bulk electrolyte, is created at the surface of the electrodes (i.e., a boundary layer). At the boundary layer only the outer portion of sulfuric acid will diffuse into the bulk electrolyte, while the remaining sulfuric acid, because it is heavier than the electrolyte, will collect in the bottom of the battery. This separation of sulfuric acid from bulk electrolyte is termed "acid stratification." The reduced level of acid at the top of the battery inhibits plate activation and increases corrosion. Also, increased acid concentration at the bottom artificially raises the voltage of the battery, which can interfere with battery management systems. Overall, acid stratification causes higher resistance which leads to shorter battery life.

Hence, there is a need for improved separators and/or batteries. For example, there may be a need for improved separators or batteries that may provide improved or enhanced charge acceptance, surface conductivity, oxidation resistance, wettability, bending stiffness, and/or cycle life, and/or reduced acid stratification, a need for batteries, especially lead acid batteries, with improved charge acceptance and/or reduced acid stratification, a need for battery separators with improved wettability, improved surface conductivity, improved oxidation resistance, and/or increased stiffness, and/or a need for manufacturing processes which allow the rapid production of battery components, including separators, with reduced rejection rates of finished separators.

SUMMARY

In accordance with at least selected embodiments, aspects or objects of the present application or invention, novel or improved separators, batteries and/or methods may address the above needs, may address the need for improved separators that may provide improved or enhanced charge acceptance, surface conductivity, oxidation resistance, wettability, bending stiffness, and/or cycle life, and/or reduced acid stratification, for improved batteries, especially lead acid batteries, with improved charge acceptance and/or reduced acid stratification, for improved battery separators with improved wettability, improved surface conductivity, improved oxidation resistance, and/or increased stiffness, and/or for improved manufacturing processes which allow the rapid production of battery components, including separators, with reduced rejection rates of finished separators, and/or may provide novel or improved separators, batteries and/or methods, and/or may provide improved or enhanced charge acceptance, surface conductivity, oxidation resistance, and/or cycle life, reduced acid stratification, improved resistance to abuse or contamination, improved resistance to metal contamination induced oxidation, reduced black residue, improved wettability, improved stiffness, improved usable life of the separator, or combinations thereof.

In accordance with at least one embodiment, aspect or object of the present application or invention, oxidation of the separator is prevented to enhance, improve or retain the desired cycle life of the battery, the usable life of the separator, or both.

In accordance with at least one embodiment, aspect or object of the present application or invention, a layer of stiffer material on the top of substrates may replace increasing the stiffness of the bulk of the separator, and thereby avoid a possible rigid, brittle bulk of the separator.

In accordance with at least particular embodiments, the battery separators described herein are directed to a multi-layer or composite microporous membrane battery separator which may have excellent oxidation resistance and are stable in a lead acid battery system. In accordance with at least other selected embodiments, the present invention is directed to a battery separator having a layer which increases oxidation resistance, improved oxidation resistance in the presence of metal ion contamination such as chromium ions, reduces acid stratification, improves surface conductivity, improves charge acceptance, increases stiffness and processability, and/or increases surface wettability.

In accordance with at least certain selected embodiments, the present invention is directed to a separator for a battery that is a microporous polymer membrane functionalized, coated, treated, or the like to add at least one material, treatment, function, or layer on at least one side thereof. In certain selected particular embodiments, the material, treatment, function, or layer may or may not include a binder, may include one or more materials such as silica, silicon oxides, alumina, aluminum oxides, metals, metal oxides, conductive carbon materials, acid stabilized cellulose, and/or the like, and/or may include one or more conductive or dielectric or insulating layers.

In accordance with at least certain embodiments, a method of obtaining improved separators is provided in which a treatment, material or layer is applied to at least one surface or side of a polymeric microporous membrane, a polyethylene (PE) microporous membrane, a woven or nonwoven material, a nonwoven glass mat, a nonwoven absorptive glass mat (AGM), a nonwoven or woven PET, cellulose nonwoven mat, and/or the like. The material, treatment or layer can be applied by vapor deposition, chemical deposition, vacuum assisted methods, PVD, CVD, TD, DCD, PACVD, DLC, thin-film coating or deposition technology, nano-film technology, single atom thick coating technology, sol-gel, solvent coating, aqueous coating, and/or the like. In some embodiments the material, treatment, coating, layer, or function is applied or added by a solvent-free method, a binder-free method, or a solvent and binder free method. In other selected embodiments, the layer is applied in the presence of a binder and/or solvent which may be subsequently removed post-process.

In accordance with at least selected embodiments, a porous membrane with a porous or ionically conductive coating or layer is provided as a battery separator in a lead acid battery and may improve the cycle life, cranking ability and high charge acceptance of the battery.

In accordance with at least particular embodiments, the battery separators described herein are directed to a multi-layer or composite microporous membrane battery separator which may have excellent oxidation resistance and are stable in a lead acid battery system. In accordance with at least other selected embodiments, the present invention is directed to a battery separator having a layer which increases oxidation resistance, improved oxidation resistance in the presence of metal ion contamination such as chromium ions, reduces acid stratification, improves surface conductivity, improves charge acceptance, increases stiffness, runnability and processability, and/or increases surface wettability. One of the methods used in polymeric separators to provide oxidation resistance is through sacrificial oxidation of residual oil. Oil (plasticizer) such as mineral oil is used as a pore forming agent during wet process formation of polyethylene (PE) separators. When residual oil is left behind on the separator, it may act as a sacrificial oxidizing species. Residual oil can be present in the separator matrix generally at a concentration of from about 8% to 20% by weight. The agent/oil acts as a sacrificial agent or component and oxidizes before the polyethylene, thereby reducing the rate at which the separator itself is oxidized. However upon oxidizing, the sacrificed oil or material can be released from the separator and may manifest as a dark or black residue or film on top of the electrolyte. Also, a layer of oxidation resistant material might replace a few percentage of oil in the separator membrane and thereby reduce black residue issues.

In accordance with at least selected embodiments, aspects or objects, the present application or invention may address the above mentioned needs or issues, and/or may provide at least one coating, layer, or material on at least one surface, rib, side, or portion of a polymeric microporous membrane. In accordance with at least selected embodiments, described are coatings, layers, films, treatments, depositions, or materials which impart improved oxidation resistance, reduced black residue, improved wettability, improved surface conductivity, and/or increased stiffness to the separator. In accordance with at least selected embodiments, described are batteries, particularly lead acid batteries, having improved cycle life, charge acceptance, and/or reduced acid stratification.

In accordance with at least selected embodiments, disclosed are methods for preparing a porous membrane having a coating, layer, or material that may impart one or more of the above-mentioned desirable properties, performance, or characteristics. In some embodiments, the coating, layer, or material includes one or more layers of electrically conductive or electrically insulating materials, for instance silica, alumina, metals, metal oxides, conductive carbon materials, cellulose, mixtures thereof, multiple layers, and/or the like.

Oxides are typically electrically non-conducting: such as, silica, silicon oxides, alumina, and aluminum oxides (silica is the common term for silicon oxide, and alumina is the common term for aluminum oxide).

Metal, metal oxides, and carbon can all be electrically conductive or partially conductive or semiconductive.

Separators are typically electrically nonconductive (insulators) but are porous and wet with electrolyte and allow ionic conductivity there through during charge and discharge of the battery. Certain materials may be electrical insulators (nonconductive) but may be thermally conductive (such as alumina).

In certain selected embodiments, the coating, layer, or material is provided on the surface of the porous membrane which faces the positive electrode, and in other embodiments, the coating, layer, or material (or a different coating, layer, or material) is provided on the surface of the porous membrane which faces the negative electrode. In certain embodiments, the coating, layer, or material (or a different coating, layer, or material) is provided on both surfaces (or sides, top and bottom sides, positive and negative faces) of the porous membrane or separator. In some selected embodiments, the porous membrane is provided as an envelope or sleeve, and the coating, layer, or material may be on the outer surface, inner surface, or on both surfaces of the envelope or sleeve.

In certain selected embodiments, provided is a layer for or on a side, surface, rib, or portion of a microporous battery separator membrane, such as in a lead acid battery, wherein the layer is possibly preferably oxidation resistant (more resistant than the base film, substrate or membrane) and is present on at least the side of the separator membrane which faces the positive electrode, for instance, at the interface of the separator and the positive electrode (or glass mat adjacent the positive electrode or plate or PAM), and that may also be stable up to a cell potential of at least about 2.1, 2.2, 2.5, or 2.7 V (volts), or higher in certain lead acid batteries or cells.

In accordance with certain embodiments, the separator membrane described herein is directed to a microporous battery separator membrane having at least one layer or deposition containing at least one material such as silica, silicon oxides, alumina, aluminum oxides, metals, metal oxides, conductive carbon materials, mixtures or blends thereof, and/or the like, where the thickness of the deposition or layer is (or depositions and/or layers are) in the range of 0.1 μm to 250 μm. A microporous membrane in a lead-acid battery, having at least one layer containing a silica, silicon oxides, alumina, aluminum oxides, metals, metal oxides, conductive carbon materials, cellulose, cellulosic materials, mixtures or blends thereof, and/or the like can result in a separator having the same or better targeted performance, characteristics or properties as separators with residual oil, that are coated with other materials and/or that do not have such a layer or coating.

A coating material used herein may be inert or reactive. Reactive material may undergo an initial reaction, for instance in the presence of oxygen, electrolyte, electromagnetic radiation (example UV) or thermal energy inputs, which causes a chemical change either throughout or at the surface of the coating or layer. The coating, layer, or material on the substrate or membrane may be the deposition or coating process starting material or may be a reacted (altered) material which is or makes up the coating or layer on the membrane surface. Also, the coating or layer may vary in concentration of the desired material (may have a gradient in concentration or density towards or away from the surface). In certain selected embodiments, the coating or layer, as described herein, may be very thin and contributes very little additional thickness to the overall thickness of porous membrane or substrate yet may provide equivalent oxidation resistance and/or stiffness as a much thicker oxidation resistant porous membrane. In certain embodiments, the coating or layer, as described herein, may be a multi-stack layer formed by different materials. In certain selected embodiments, the inventive separators contain substantially less processing oil than conventional separators, because the inventive coating layer reduces the need for a sacrificial agent to prevent separator oxidation. In certain selected embodiments, the separators contain substantially little or no processing oil, or no processing oil at the surface.

In certain selected embodiments, the inventive coating, layer, material, and/or the like can increase the wettability of the separator. Traditional polyolefinic separators typically have relatively hydrophobic surfaces due to the crystallinity and polymer condensation that occurs at the surface of traditional separators. In certain selected embodiments, the inventive coating material is a porous, hydrophilic material which optionally penetrates the surface of the polymeric hydrophobic separator. See FIGS. 7 and 7A. However, the surface alone can be hydrophilic due to coating material penetration or the energetic beam or ion beam plasma, such as in physical vapor deposition (PVD), might make the coating component to embed itself onto the surface forming a graded interface, this can contribute to better adhesion of coating to the substrate, and/or it can form extended interface with better properties, such as hydrophilicity of the hydrophobic surface of the porous separator membrane or substrate, thereby increasing the wetting rate (of water or sulfuric acid) of the treated, coated or modified separator. In some instance, the penetration occurs concurrently with the application of the coating to the porous membrane, and in other embodiments, the penetration is achieved by compression, calendering, thermal treatment to aid interfacial diffusion or other physical means after the coating material or deposition has been applied. One possible coating material or component is cellulosic or cellulose, especially or possibly preferably a cellulose coating or material on the positive side of the substrate or separator (the side facing the positive plate or electrode).

In at least certain embodiments, the inventive coating material may be electrically conductive and may provide enhanced current distribution across a polymeric microporous membrane. Such enhanced distribution can improve electronic interaction with active material or PAM like $PbO_2$, thereby improving the speed at which lead sulfate (is formed) or is reduced, and thus improve the ability of the battery to receive a higher rate of charge (i.e., improve charge acceptance). By having a partially electrically conductive insulating film (such as silica or alumina) on the surface of an insulating polymeric film, the ionic conductivity from $PbO_2$ to separator is expected to happen with ease. Having one or more layers or coatings as an interface to reduce the barrier to ionic diffusion should improve surface conductivity, charge acceptance, and cycle life. Such inventive coatings or layers may reduce the interface barrier between the conductive positive plate's Positive Active Material (PAM) and the insulative polymeric separator membrane or substrate. For example, it is contemplated to add carbon, metal, conductive material, or semiconductive material on the polymeric base membrane or film or over a silica coating or layer on the polymeric base membrane, substrate or film (transition layer or layers).

Various ceramic particle-containing coatings, ceramic coatings, inorganic coatings, organic coatings, inorganic and organic coatings, and/or polymeric coatings for microporous battery separator membranes may provide improvement in safety, battery cycle life and/or performance. Such coatings may include one or more polymers, inorganic or organic polymers or polymeric materials, polymeric binders, one or more types of inorganic or organic particles, inorganic ceramic particles and a water based or a non-aqueous solvent. Such coatings may be applied using various technologies such as, but not limited to, PVD, CVD, sol-gel, dip coating, knife, gravure, curtain, spray, etc.

There is a need for improved battery separators which address some or all of the foregoing needs, issues or problems. For instance, there is a need for batteries, especially lead acid batteries, with improved charge acceptance and/or reduced acid stratification. There is a need for battery separators with improved wettability, improved surface conductivity, improved oxidation resistance, and/or increased stiffness. There is a need for manufacturing processes which allow the rapid production of battery components, including separators, with reduced rejection rates of finished separators.

In at least certain embodiments, the coating, as described herein, may react with either atmospheric oxygen or electrolyte (sulfuric acid) to form a passivation layer. This passivation layer may be resistant to oxidation and may provide an additional protective layer on the surface of the reactive metal, for example, aluminum that may prevent oxidation. Once the passivation layer has formed, a higher level of oxidation stability for the improved separator may be achieved. In other embodiments, the passivation layer may be obtained by subjecting the coating layer to thermal, UV or other energy inputs.

In accordance with at least selected embodiments, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments, the present application is directed to novel or improved microporous membranes, battery separator membranes, separators, energy storage devices, batteries including such separators, methods of making such membranes, separators, and/or batteries, and/or methods of using such membranes, separators and/or batteries. In accordance with at least certain selected embodiments, the present invention is directed to a separator for a battery which has an oxidation protective and binder-free deposition layer which is stable up to at least 2.1, 2.2, 2.5, or 2.7 volts, or even higher in certain lead-acid batteries or cells.

BRIEF DESCRIPTION OF THE FIGURES

FIG. 5A is a table of non-limiting exemplary embodiments to be read in conjunction with the following description.

FIG. 5B is another table of non-limiting exemplary embodiments to be read in conjunction with the following description.

DETAILED DESCRIPTION

Figure 1:
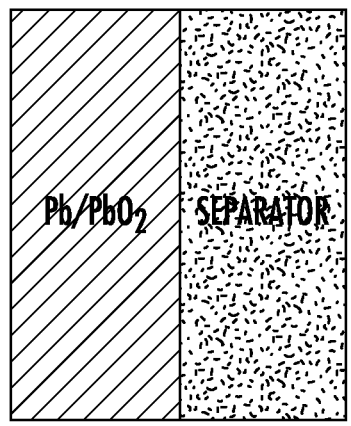
FIG. 1 is a schematic vertical cross-section view of a conventional positive plate and adjacent battery separator, such as a microporous PE membrane separator.

Embodiments of the claimed invention will now be discussed in detail. Certain terms and phrases shall be used as they are commonly known in the art and/or as defined below.

Oxidation Resistance—The oxidation zone in a lead acid battery is at the interface between the positive electrode, which is either a lead or a lead-alloy grid pasted with positive active material (PAM), which may be $PbO_2$, and the electrolyte, which may be sulfuric acid. This oxidation zone is of the order of several hundred μm and extends into the electrolyte where the separator is placed. It is evident that the separator will be subjected to oxidation if it is in contact with the positive electrode. In at least one embodiment, it is believed necessary to provide oxidation resistance as one of the preferred characteristics of the inventive separator. Polymers in general are not oxidation resistant. Different methods or layers are disclosed herein to provide oxidation resistance to a polymeric separator.

Sacrificial Material in the Separator—Polyethylene Separators are the predominate material used in flooded lead acid batteries on a world-wide basis. In order to protect the polyethylene from oxidation attack which occurs in the lead acid battery, residual pore forming agent or oil is left in the separator matrix up to 8% to 20% by weight. The oil will act as a sacrificial material and oxidize before the polyethylene. However upon oxidizing, the oil is likely to be released from the separator and may manifest itself as a black film or residue on top of the electrolyte.

Glass Mat as an Interlayer—A thin layer of glass fiber mat may be attached or placed loosely between the polymeric separator and positive electrode. Glass is not oxidized by electrochemical potential or acid in lead acid batteries. This glass mat is in contact with positive electrode and does not undergo oxidation like polymer.

The present invention may add coatings as a means to, for example, improve the oxidation resistance of the PE separator, to replace the glass mat, or in addition to the glass mat that will allow for the oil, which is a pore forming agent, to be removed or greatly reduced and thus minimize the possible occurrence of black residue generation, to reduce the barrier to ionic diffusion, to increase surface conductivity, to enhance or facilitate charge acceptance, to reduce acid stratification, and/or the like. The coating may include polymer, binder, particles, fibers, and/or the like.

Stiffness or Processability—When producing automotive batteries, the PE separator typically envelops or pockets, either the positive and/or negative plate. This enveloping is done with automated equipment in a continuous fashion. Traditionally, the separator has not been the typical failure mode of automotive batteries, therefore the thickness of the separator has decreased over the years such that automotive battery manufacturers have migrated from 250 µm down as low as 150 µm backweb thickness. As the bending stiffness is related to the cube of the thickness, such that a 30% reduction in thickness is likely to result in a 70% decrease in bending stiffness, the bending stiffness has decreased substantially and the separator has become more of a challenge to process on existing equipment. This also increases the propensity for inadvertent folds and creases such that more product is rejected at the automated equipment or that the running speeds have to be substantially reduced, which reduces productivity. Therefore, the present invention may also provide a means to go thinner, increase running speed, or for improving bending stiffness, and/or a method of improving bending stiffness of the separator, or any combination thereof.

Surface Conductivity—The electrical current is carried into the active material (PAM or NAM) via the positive or negative grid. It is known that the active material extends the plate grid either vertically, horizontally or laterally, or even into the depth of the electrode and occupies different distances from grid. Therefore, the rate of conversion of active material will not be uniform but likely is a function of distance from the current collector. Therefore, the idea is to make the surface of the separator or associated laminate conductive so that the electrons will have alternative paths to flow and react with the active material. To the degree of which this can be achieved there reflects more efficient use of the active material in the energy storage reactions in both speed of conversion and degree of utilization. Therefore, a means and method for improving the charge acceptance of the battery via modifications to the separator is described herein.

Acid Stratification—When lead acid batteries are deeply discharged the gravity of the electrolyte will decrease as the sulfuric acid is also a participant in the energy storage reactions. Upon recharging, pure sulfuric acid will be created at the surface of the electrodes, which will be heavier than the bulk electrolyte gravity. As this boundary layer of sulfuric acid is created at the electrode surface, it will create a boundary layer of which only the outer layers of sulfuric acid will diffuse into the bulk electrolyte, while the remaining boundary layer will be subjected to gravity and collect in the bottom of the battery. As a battery is overcharged, gas bubbles will nucleate and rise to the top of the battery and carry some sulfuric acid to the top, thus creating a mixing effect within the battery to at least partially overcome acid stratification. If the battery is not sufficiently over charged, the stratified acid will be of detriment to the electro-chemical performance of the battery going forward for it is inside the battery but not at the right place, or spread about properly, in order to react with the entirety of the active material. Therefore, embodiments of the present invention provides a means for, and/or a method for reducing or breaking the boundary acid created at the electrode surface, and/or allowing for acid mixing, and/or preventing acid stratification without the use of overcharging and resultant gas evolution.

Improved Separator Wetting—It has been found that the surface of the PE separators often are reasonably hydrophobic as they have polymer rich surface due to the nature of crystallinity and polymer condensation. This polymer rich layer may only be a few µm thick and once it is penetrated the highly porous separator matrix beneath it is sufficiently hydrophilic. Due to this situation, hydrophilic surfactants are often supplied to the separator surface or matrix to overcome this situation. In preferred embodiments, means for and/or alternative methods for wetting the surface of the separator matrix are provided.

All of the above mentioned embodiments of the present invention may share one common thing, which is forming, coating or depositing on to the surface of the separator or laminate a layer (or layers) of functional material to enhance the performance of the separator and the battery of which the separator is placed, battery production, and/or the like, and any combination thereof. Therefore, it is unexpectedly conceived that various functional materials can be applied by vapor deposition, chemical deposition, solvent coating, aqueous coating and various combinations to the lead acid battery separator adjacent the PAM, NAM, or both, and with or without a glass mat. In certain embodiments, it is preferred that the added layer or layers may be in the range of 0.1 µm to 250 µm, possibly preferably approximately 5 µm up to approximately 75 µm each or combined.

The coating can be a mixture of fibers, such as glass fibers, and particles, such as silica, where by the glass fiber resists acid stratification in addition to oxidation. This can be achieved by coating a sol-gel of material mixture containing glass fibers, silica, and binder, and dispersing medium or solvent by roller or spray coating, and the dispersing medium (e.g., water) may then be dried off. The binder will bond the composite material together and with the substrate.

Oxidation Resistance and Black Residue—As precipitated silica is inherently porous in structure and inert against oxidative attack that would be found in a lead acid battery, it is proposed to deposit a thin layer of silica on the surface of the separator or polymer membrane or substrate. It may be preferred that this silica be deposited in such a manner that the resulting sub-structure will still be porous and inherently adhered to the separator surface.

In application, the backweb, ribs, and/or the substrate may inadvertently come in contact with the positive electrode. During charging, and especially during overcharging, at the surface of the electrode nascent oxygen or oxidizing species will be generated. As they will come in contact with the separator, the bare polymeric separator surface may be oxidized, and especially the polymer which is what binds the separator constituents together. Given enough time these oxidizing species may actually create splits and cracks in the separator which may ultimately allow for electronic conductive paths between the positive and negative electrodes, which can short the battery.

With an oxidative resistance layer of silica on the separator surface, many actions can be taken. First, the residual pore forming agent or oil may be greatly reduced for it will may no longer be needed to protect the polymer as that function will have been switched to the silica layer. With a reduced residual pore forming agent present in the separator, the propensity for black residue may decrease. With improved oxidation resistance, the substrate or backweb thickness may further be reduced without fear of failure due to oxidation, cracks, splits, tears, or any combination thereof.

Stiffness, Runnability and Processability—The bulk of lead acid battery separators are three dimensional structures which include a substrate or backweb at a given thickness and a three dimensional shape such as a continuous trapezoid or rib protruding off the substrate surface(s). Due to this arrangement, the lowest resistance to bending is found in the perpendicular direction to the ribs. As the separators are typically sold in roll form, if very thin, they may be prone to folding, wrinkling or becoming skewed as the substrate is distorted across the width or cross machine direction (CMD) of separator. One method to improve the CMD bending resistance or stiffness is to deposit a material with a low degree of bending resistance or something that is semi-rigid. One embodiment deposits a layer of carbon or silica and the resultant network would not be as prone to bending but actually be substantially rigid. This rigidity could be enhanced by the degree of packing of the individual particles and thickness of the layer or layers deposited on the substrate.

One possibly preferred embodiment is to deposit a continuous stiffening layer on either side of the separator (or both sides) regardless of whether the coating faces the negative or positive electrode. Stiffness can also be enhanced even if a layer of these materials are deposited not in a continuous layer but in a stripped or cross hatched pattern.

Improved Separator Wetting—To improve the separator wetting in the absence of surfactants it is proposed to deposit on the surface of the separator a thin layer of highly porous silica. This deposited silica, may require some additional calendaring forces to actual penetrate through the rich polymer layer so as to improve the wetting rate of the separator.

Surface Conductivity—To improve surface conductivity, it is foreseen to deposit carbon structures (e.g. graphite, graphene, carbon, CNT, etc.) that are sufficiently conductive, onto the surface of the separator facing the negative electrode, or on ribs facing the positive surface, or on a laminate, or AGM separator that is in direct contact with the positive plate. As the lead acid battery is discharged, a layer of lead sulfate is formed at the electrode surface which is fairly non-conductive in relation to the surrounding lead. As the aforementioned materials with a conductive layer will be in contact with the electrodes, this will allow any surface charge to be transferred via conductive paths that are now found on the separator and thus reduce the sulfate layer in a more efficient manner. Here it is important to note the paths of conductance are being created mainly in the X and Y plane of the separator and not all the way through the Z plane. If electronic conductivity is achieved through the Z plane, then there will be electronic conductance and the separator will cease to perform its function as this will short the battery. By creating alternative paths of conductance on the X and Y plane, it is foreseen to improve the speed at which lead sulfate is reduced and thus improve the ability to receive a higher rate of charge which is commonly referred to as charge acceptance.

This layer of conductivity can also be applied to the ribs or laminate structure such as in pasting paper, a retainer mat, an AGM separator, or a gauntlet, all of which come in intimate contact with the positive electrode. As the positive active material on the plate is converted at different rates, depending on distance from the source of the current collector, some portions of the plates will be fully charged quickly and go into gassing while other portions of active material will remain undercharged and need more current. Thus, some portion of the current may be wasted as gassing starts and cause higher rates of positive grid corrosion. By providing alternative paths of current distribution to the positive grid, current crowding is eliminated, the conversion will become more efficient resulting in less gassing and lower grid corrosion rates. These alternative paths of current distribution are from the conductive layers, such as, for example, carbon structures, that are now on the separator ribs, AGM separator, or the laminate structure that are in direct contact with the positive electrode. The conductive material could easily contact to the positive paste (PAM) during formation of batteries resulting in enhancing conductive paths and reducing or eliminating the interface barrier between the separator and the positive paste (positive plate).

Acid Stratification—To prevent acid stratification, the boundary layer of sulfuric acid that is being formed at both positive and negative plates during charging may be broken up. Therefore, it is foreseen that whatever material is in contact with the plate surface, negative or positive, has a deposit a thin layer of porous silica. As this silica layer will be inherently porous and have a very high surface area, the acid will rapidly diffuse allowing it to readily mix with the bulk of acid. As this silica layer may be in direct contact with the plate surface, it will serve also to mechanically interrupt the laminar flow of the boundary of acid to be acted upon primarily by gravity.

Therefore, one could foresee that this silica layer may be deposited on the surface of the separator, or on the ribs, AGM, a laminate structure that is in direct contact with the plates, such as pasting paper, retainer mats, or gauntlets, or any combination thereof.

The material, treatment or layer can be applied by vapor deposition, chemical deposition, vacuum assisted methods, PVD, CVD, TD, DCD, PACVD, DLC, thin-film coating or deposition technology, nano-film technology, single atom thick coating technology, sol-gel, solvent coating, aqueous coating, and/or the like, or any combination thereof. For example:

PVD: Physical Vapor Deposition—atoms are dislodged from a metal or alloy or a composite target using a high energy beam and deposited on the surface of interest. Atoms escape the target surface in ionized vapor form. Different energy sources are possible, such as electron beam, thermal energy, electric resistance heating of surface, pulsed laser, plasma discharge, etc. All these methods are vacuum assisted.

CVD: Chemical Vapor Deposition—A reactive precursor containing the material to be deposited in some chemical form reacts or decomposes on the substrate surface and forms a deposit. The volatile by-products of precursor decomposition or reaction will be pumped out of the deposition chamber. Precursors are gaseous species, chemically designed to form the deposit of the right chemical nature on the surface. The unneeded portion of precursor leaves the chamber. Depending upon the chamber pressure, the CVD method is called atmospheric pressure (APCVD), low pressure (LPCVD) and ultrahigh vacuum (UHVCVD). Plasma enhanced (PACVD) uses plasma to enhance the reaction of the precursor. Other variations to fit the needs of deposition are also possible.

DCD: Dynamic Compound Deposition—Coatings are formed by a low temperature process in which a dry film is formed on the surface. The deposition is based on the principle of in-situ mechanical activation and chemical transformation of the surface. This can be assisted by PVD or CVD or combinations thereof. Micro and macro structures can be developed on the surface using this process. One can envision forming just ribs by this process or forming a coating over the entire surface.

Thermal or Thermoreactive Deposition (TD) is a high temperature deposition process for producing high temperature stable materials such as oxide, carbide, etc.

DLC may be diamond like carbon. Diamond like carbon is an insulating or dielectric material.

Out of the many property sets required in separators, some are bulk and others are surface properties. At least selected embodiments of this invention may address surface related properties at the surface, and in doing so may reduce the requirements or cost of the bulk. For example, oxidation resistance is required at the surface of contact with positive plate, so we can reduce oxidation resistant components throughout the bulk. Also, properties such as surface conductivity, oxidation resistance, acid stratification reduction, improved wettability are required at the surface, so we can address these at or on the surface, for example, by coating.

Surface coatings comprising of polar materials such as silica, alumina, etc. by any method such as chemical vapor deposition, atomic layer deposition (ALD), sol-gel coating, roller coating, etc. may provide the needed performance in terms of reducing acid stratification, improving oxidation resistance, increasing wettability, higher surface ionic conductivity, and so on. Precise thickness to the desired or required level can be done using these methods. High level of purity can also be accomplished by these methods.

By having carbon or any other conductive or semiconductive layer or a combination of conductive and polar layers (silica and carbon together for example), one can envision improving charge acceptance.

Vapor deposition processes are vacuum or low pressure assisted processes. Having oil in the separator may result in blistering of coatings as oil tends to ooze out of pores in vacuum. By having a dry film coated with the inventive layers, this issue is eliminated. Also, adhesion of the layer to the substrate may not be a big issue as the separator also contains silica which will help with bonding the polar oxide coatings to the substrate.

Advantages of at least certain embodiments of the invention:

1. Providing functions where it is needed through surface layers helps in isolating the issues and solving by multiple methods.
2. Improving surface properties will not only improve separator performance but extends to improving charging and discharging performance, charge acceptance, etc. of batteries.
3. A myriad of coating methods and materials are possible. Even glass fibers, cellulose fibers, carbon fibers, conductive carbon fibers, and/or the like can be coated on the surface of separators using roller coating with small amount of binders. This can be applied as a rib by using screen printing methods through a mask.

Non-Limiting Examples a. Same material coated on both sides

The polymer substrate may be coated on both sides with a conductive carbon coating applied by roller coating. Desired coating thickness may be from approximately 1 µm to approximately 20 µm. This may improve the surface conductivity of the surface, reduce current crowding, improve current distribution, and improve charge acceptance of batteries built with such separators. Carbon, being porous, may also provide retention of acid reducing acid stratification on both electrodes.

b. Different coating on each side

Example: Alumina on positive side and silica on negative side

Aluminum may be deposited on the separator by physical vapor deposition in the presence of oxygen. Due to the presence of plasma and oxygen, aluminum at the substrate surface becomes alumina and deposits on the surface. The thickness of the coating is preferred to be of the order of approximately 2 µm to approximately 10 µm. Alumina, being highly polar, is hypothesized to reduce the barrier to diffusion of ions at the positive interface between electrode and separator. Alumina, being porous, reduces the acid stratification. Alumina also could potentially lock (bind) metal ions that are deleterious to the performance of lead acid batteries, such as Sb, Cr, Ni, Mn, etc. Silica on the negative side can be deposited by sol-gel methods using precipitated silica in a small quantity of polymeric binder, such as, for example, acrylic resin. A roller coating method may also be used to get a thin uniform coating preferably of the order of approximately 1 µm to approximately 20 µm or higher. High surface area silica and alumina could potentially prevent migration of harmful ions, reduce acid stratification and increase stiffness of films and puncture resistance. Alumina on the positive side provides oxidation resistance. Therefore, the polymeric separator may have less oil, which is a sacrificial oxidizing medium in a polyethylene separator, which in turn may reduce the propensity to black residue formation, reduce cost, etc.

c. Two or more layer coatings

Three or more layers: Carbon (spray coating)/Alumina (reactive PVD)/silica (sol-gel)/separator/carbon (spray coating) from positive to negative plate facing sides Similar methods as above may be employed. Silica may preferably be first coated on one side of separator. Alumina may then be deposited on top of the silica. Carbon may then be deposited on both sides. This enables both surface conductive properties and hydrophilic properties from alumina and silica. Alumina and silica provide oxidation resistance to the polymeric separator.

d. Gradient coating (coating surface is high in carbon, and near base film coating is high in alumina)

Carbon/Alumina-Carbon Composite/Separator

A separator may first be coated with alumina using reactive physical vapor deposition in oxygen to get approximately 2 µm to approximately 4 µm. The target is changed to an Al—C composite target which when sputtered gives rise to a different loading of carbon in Alumina. This provides a gradation in concentration of carbon with low amounts close to separator. The top most layer of carbon is deposited by CVD. By doing this, a gradation in concentration of carbon is accomplished with 100% carbon on the surface to approximately 50% carbon at the intermediate regions to approximately 0% Carbon close to the PE separator surface. By doing this, ionic conductivity may be extended, a higher porosity may be achieved for capturing contaminants such as Cr, Mn, etc., and a reduced need for oil which reduces black residue.

e. Possible two layer coatings

Carbon on Alumina on Separator.

Carbon by CVD or roller coating. Benefits: surface conduction, oxidation resistance, reduced acid stratification, improved charge acceptance.

Alumina by reactive PVD: increased diffusion of ions through separator. Reduced migration of harmful ions such as Cr, Sb, Mn from positive to negative electrode.

f. Possible gradient coatings

Carbon gradient is preferred because of the electrical conductivity it provides.

Alumina coating is also preferred as it has high oxidation resistance.

g. Possible positive plate side coatings

Preferred positive side coating is something that provides high oxidation resistance in deep cycle flooded lead acid batteries. Conductive carbon that provides high surface conduction in Starting, Lighting, Ignition (SLI) batteries to provide high Cold Cranking Amps (CCA) and dynamic charge acceptance.

h. Possible negative plate side coatings

The negative side of the separator does not get oxidized. However, the presence of porous coatings on the top reduces acid stratification. Carbon provides improved interfacial conduction on the negative side and may improve capacity.

i. Other possibly preferred examples

A coating of Nafion (a sulfonated tetrafluoroethylene based fluoropolymer-copolymer) or Polytetrafluoroethylene (PTFE) which may be used in flow batteries may prevent diffusion of vanadium, chromium, iron, etc. This property is very useful to lead acid batteries that may be plagued by elements like Antimony (positive grid is made of Pb—Sb for deep cycling performance), Chromium that may come from make-up acid in dry charge batteries, iron from the silica used in PE separators, etc. These elements are electrochemically active in lead acid battery potential regimes and may induce oxidation of separators (Cr, Fe) or increase hydrogen gas evolution (Sb) due to reduced hydrogen overvoltage of antimony when deposited on the negative plate. Nafion may prevent diffusion of these ionic species. A thin coating of thickness around approximately 2 μm to approximately 10 μm is thought to be able to provide the needed barrier properties for the diffusion of these ions. If this material is deposited on top of an AGM, it opens up a new possibility of using AGM type separators in antimony containing systems. Similar functions are expected from materials such as polyethylene oxide with sulfonic acid containing side chains or other complexing groups as side chains.

j. Cellulosic separators or paper separators are commonly used in dry charge batteries. Such separators are in general formed of four basic components: cellulose fibers, phenol formaldehyde resin (Novolacs), wetting agent and cellulose binder. Cellulose imparts resistance to oxidation during formation and functioning of batteries. Inventive PE separators can be coated with a layer of cellulose-binder mixture of the order of 1 to 20 μm. The surface layer will impart the needed oxidation resistance to the PE separator in Cr or other metal containing environments such as those found in dry charge batteries.

k. Possible Coatings to Battery Case, Plates, Glass Mats, View Device, and/or Separator A thin layer of glass fiber with a small quantity of organic binder (less than approximately 1%) may be deposited on top of a PE separator by spray coating or roller coating, etc. The whole assembly is cured to form a thin layer glass fiber layer on top of the separator. The glass fiber has very high oxidation resistance and offers capillary forces to retain acid and prevent acid stratification.

Microporous Membranes

The inventive separator preferably includes a porous substrate or membrane (such as a microporous membrane having pores less than about 1 μm, mesoporous, or a macroporous membrane having pores greater than about 1 μm) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The preferred microporous membranes may have pore diameters of about 0.1 μm (100 nm) or less and porosities of about 60%. The polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultrahigh molecular weight polyethylene (UHMWPE), and polypropylene. One preferred embodiment may include UHMWPE and a filler. In general, the preferred separator may be made by mixing, in an extruder filler, UHMWPE, and processing oil. In some embodiments, the preferred separator may be made by mixing, in an extruder, about 30% by weight filler with about 10% by weight UHMWPE, and about 60% processing oil. In other embodiments, the filler content is higher, for instance, about 50%, 60%, 70% or 80% by weight. In other selected embodiments, the processing oil is present in an amount that is not more than 60%, 50%, 45%, 40%, 35%, 30%, 25%, 20%, 15%, or 10% by weight. The mixture may also include minor amounts of other additives or agents as is common in the separator arts (such as wetting agents, colorants, antistatic additives, and/or the like) and is extruded into the shape of a sheet.

The microporous separator layer is preferably made of a polyolefin, such as polypropylene, ethylene-butene copolymer, polyethylene-polybutadiene copolymer, polyethylene-polyisoprene copolymer and preferably polyethylene, more preferably high molecular weight polyethylene, i.e. polyethylene having a molecular weight of at least 600,000, even more preferably ultrahigh molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultrahigh molecular weight polyethylene (UHMWPE) mixed with a processing oil and filler. In accordance with at least one other embodiment, the separator is made up of an ultrahigh molecular weight polyethylene (UHMWPE) mixed with a processing oil, additive and talc. The microporous polymer layer preferably comprises a homogeneous mixture of 8 to 100 vol. % of polyolefin, 0 to 40 vol. % of a plasticizer and 0 to 92 vol. % of inert filler material. The preferred filler is talc. The preferred plasticizer is petroleum oil. Since the plasticizer is the component which is easiest to remove from the polymer-filler-plasticizer composition, it is useful in imparting porosity to the battery separator.

In certain embodiments, residual processing oil may be removed after extrusion by conventional methods, such as solvent washing, oven, or the like. In certain selected embodiments, the final amount of processing oil that is present in the extruded polymer is no more than 20%, 18%, 16%, 14%, 12%, 10%, 9%, 8%, 7%, 6%, 5%, 4%, 3%, 2%, 1% or 0.5% by weight.

In some instances, the preferred filler is dry, finely divided silica. However, the filler may be selected from the group consisting of: silica, fumed silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, conductive carbon fibers, other conductive fibers, cellulose fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, magnesium carbonate, and the like, and various combinations thereof. For example, a thin layer of fumed silica may be applied using organic solvents and could potentially eliminate acid stratification and provide oxidation resistance. The thin layer of fumed silica may include carbon or other materials. For example, infiltrating fumed silica and cellulose fiber and binder together as film on top of PE membrane may hold the fumed silica in place. Also, a thin layer of fumed silica may be applied on one side and a carbon layer may be applied on the other side, or a thin layer of carbon may be applied over the thin layer of fumed silica.

The porous membrane used in various embodiments herein may be provided with one or more additives or agents. One such additive that may be present in the polyolefin is a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated fatty alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive, agent or surfactant can be represented by a compound of Formula (I)

in which
R is a non-aromatic hydrocarbon radical with 10 to 4200 carbon atoms, preferably 13 to 4200, which can be interrupted by oxygen atoms,
$R^1$ is H, —$(CH_2)_k$COOM$^{x+}_{1/x}$ or —$(CH_2)_k$—SO$_3$M$^{x+}_{1/x}$, preferably H, where k is 1 or 2,
M is an alkali metal or alkaline-earth metal ion, H$^+$ or NH$_4^+$, where not all the variables M simultaneously have the meaning H$^+$, n is 0 or 1,
m is 0 or an integer from 10 to 1400 and
x is 1 or 2,
the ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

The use of the compounds of Formula (I) for the production of an additive for various porous membrane described herein may also provide such separators with effective protection against oxidative destruction. In some embodiments, porous membrane are preferred which include an additive containing a compound according to Formula (I) in which
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—[$(OC_2H_4)_p(OC_3H_6)_q$]—, in which
$R^2$ is an alkyl radical with 10 to 30 carbon atoms, preferably 12 to 25, particularly preferably 14 to 20 carbon atoms,
P is an integer from 0 to 30, preferably 0 to 10, particularly preferably 0 to 4 and
q is an integer from 0 to 30, preferably 0 to 10, particularly preferably 0 to 4,
compounds being particularly preferred in which the sum of p and q is 0 to 10, in particular 0 to 4,
n is 1 and
m is 0.

Formula $R^2$—[$(OC_2H_4)_p(OC_3H_6)_q$]— is to be understood as also including those compounds in which the sequence of the groups in square brackets differs from that shown. For example according to the invention compounds are suitable in which the radical in brackets is formed by alternating ($OC_2H_4$) and ($OC_3H_6$) groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only partially, soluble in water and sulphuric acid have proved to be particularly advantageous.

Also preferred are additives which contain a compound according to Formula (I), in which
R is an alkane radical with 20 to 4200, preferably 50 to 750 and quite particularly preferably 80 to 225 carbon atoms,
M is an alkali metal or alkaline-earth metal ion, H+ or NH4+, in particular an alkali metal ion such as Li+, Na+ and K+ or H+, where not all the variables M simultaneously have the meaning H+, n is 0, m is an integer from 10 to 1400 and x is 1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The porous membrane can be provided in various ways with the additive or additives. The additives can for example be applied to the polyolefin when it is finished (i.e. after the extraction) or added to the coating mixture used to produce the porous membrane (for instance, during polymerization). According to one possibly preferred embodiment the additive or a solution of the additive may be applied to the surface of the porous membrane or the surface of the coating. This variant is suitable in particular for but not limited to the application of non-thermostable additives and additives which are soluble in the solvent used for the subsequent extraction. The coating need not go through extraction after coating. For example, after PE separator is formed through extrusion extraction process, this coating mixture of materials and additive can be coated as film on the PE membrane with no extraction afterward, and if the additive coating precedes a conductive or oxidation resistant, stiffness enhancing coating(s), the additive being polar material could increase the adhesion between the PE substrate and the top coating.

Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the porous membrane. For embodiments in which the coating layer is present on only one side of the porous membrane, the additive can be applied to the coating layer, to the side to which the coating layer is not applied, or to both sides of the separator.

The additive can be present at a density of at least 0.5 g/m2, 1.0 g/m2, 1.5 g/m2, 2.0 g/m2, 2.5 g/m2, 3.0 g/m2, 3.5 g/m2, 4.0 g/m2, 4.5 g/m2, 5.0 g/m2, 5.5 g/m2, 6.0 g/m2, 6.5 g/m2, 7.0 g/m2, 7.5 g/m2, 8.0 g/m2, 8.5 g/m2, 9.0 g/m2, 9.5 g/m2 or 10.0 g/m2. The additive can be present on the separator at a density between 0.5-10 g/m2, 1.0-10.0 g/m2, 1.5-10.0 g/m2, 2.0-10.0 g/m2, 2.5-10.0 g/m2, 3.0-10.0 g/m2, 3.5-10.0 g/m2, 4.0-10.0 g/m2, 4.5-10.0 g/m2, 5.0-10.0 g/m2, 5.5-10.0 g/m2, 6.0-10.0 g/m2, 6.5-10.0 g/m2, 7.0-10.0 g/m2, 7.5-10.0 g/m2, 5.0-10.5 g/m2, 5.0-11.0 g/m2, 5.0-12.0 g/m2, or 5.0-15.0 g/m2.

The application may also take place by dipping the porous membrane or separator in the additive or a solution of the additive and subsequently optionally removing the solvent, e.g. by drying. In this way the application of the additive can be combined for example with the extraction often applied during polyolefin production.

The thickness of the porous membrane is preferably greater than 0.1 mm and less than or equal to 5.0 mm. The thickness of the porous membrane can be within the range of 0.15 to 2.5 mm, 0.25-2.25 mm, 0.5-2.0 mm, or 0.75-1.5 mm. The porous membrane can be approximately 0.8 mm or 1.1 mm thick.

In certain selected embodiments, the backweb thickness of the porous membrane is no more than 500 μm, 400 μm, 300 μm, 250 μm, 200 μm, 175 μm, 150 μm, 125 μm, 100 μm or less. In various embodiments, the porous membrane contains ribs. The preferred ribs may be 0.008 mm to 1 mm tall and may be spaced 0.001 mm to 10 mm apart. For example, the ribs can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart. In some embodiments, the ribs may be in a pattern such as they may be on one side of the separator layer or on both sides of the porous membrane, from 0 to 90 degrees in relation to each other. In certain selected embodiments, the ribs are on both sides of the porous membrane, at an angle of 0, 45, or 90 degrees from each other. Various patterns including ribs on both sides of the separator layer may include negative cross-ribs on the second side or back of the separator.

In accordance with at least another object of the present invention, there is provided a porous membrane with ribs. The porous membrane can have transverse cross-ribs on the opposite face of the porous membrane as the longitudinal ribs. In some embodiments of the present invention, the ribbed porous membrane can have a transverse rib height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. The ribbed porous membrane can have a transverse rib height between 0.005-1.0 mm, 0.01-0.5 mm, 0.025-0.5 mm, 0.05-0.5 mm, 0.075-0.5 mm, 0.1-0.5 mm, 0.2-0.4 mm, 0.3-0.5 mm, or 0.4-0.5 mm.

In some embodiments of the present invention, the ribbed porous membrane can have longitudinal rib height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribbed porous membrane can have a transverse rib height between 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.5-1.0 mm, 0.4-0.8 mm or 0.4-0.6 mm.

In some embodiments of the present invention, the ribbed porous membrane can have a sheet (substrate) thickness of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. The ribbed porous membrane can have a sheet (substrate) thickness between 0.005-1.0 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.4-0.9 mm, 0.4-0.8 mm, 0.5-0.8 mm or 0.6-0.8 mm.

In some embodiments of the present invention, the ribbed porous membrane can have overall thickness (positive rib+backweb+negative rib) of at least 0.05 mm, 0.1 mm, 0.25 mm, 0.5 mm, 0.75 mm, 1.0 mm, 1.5 mm, 2.0 mm, 2.5 mm, 3.0 mm, 3.5 mm, 4.0 mm, 4.5 mm, 5.0 mm, or 6.0 mm. The ribbed porous membrane can have a transverse rib height between 0.05-5.0 mm, 0.1-5.0 mm, 0.2-5.0 mm, 0.5-5.0 mm, 1.0-5.0 mm, or 1.0-4.0 mm.

In some cases the ribs need not be present on one or both sides. For example, the separator, substrate or membrane may be a flat sheet or only have ribs on one side.

With regard to at least selected embodiments of the present invention, the ribbed porous membrane can have the following:
1) Transverse Rib Height—preferably between about 0.02 to 0.45 mm, and most preferably between about 0.075 to 0.3 mm.
2) Sheet (Substrate) Thickness—preferably between about 0.065 to 0.75 mm.
3) Overall Thickness (positive rib+backweb+negative rib)—overall thickness of the separator between about 0.10 to 6.0 mm, preferably between about 0.20 to 4.0 mm.

The ribs may be serrated. The serrations may have an average tip length of from 0.05 mm to 1 mm. For example, the average tip length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The serrations may have an average base length of from 0.05 mm to 1 mm. For example, the average base length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The serrations may have an average height of from 0.05 mm to 1 mm. For example, the average height can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm. For embodiments in which the serration height is the same as the rib height, the serrated ribs may also be referred to as protrusions.

The serrations can have an average center-to-center pitch of from 0.1 mm to 50 mm. For example, the average center-to-center pitch can be greater than or equal to 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The serrations can have an average height to base width ratio of from 0.1:1 to 500:1. For example, the average height to base width ratio can be greater than or equal to 0.1:1, 25:1, 50:1, 100:1, 150:1, 200:1, 250:1, 300:1, 350:1, or 450:1; and/or less than or equal to 500:1, 450:1, 400:1, 350:1, 300:1, 250:1, 200:1, 150:1, 100:1, 50:1, or 25:1.

The serrations can have average base width to tip width ratio of from 1000:1 to 0.1:1. For example, the average base width to tip width ratio can be greater than or equal to 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the porous membrane can be perforated. A perforation can be a row or line of substantially identically sized holes. The rows or lines may be spaced 0.001 mm to 10 mm apart. For example, the rows can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart.

The perforations may have an average hole length of from 0.05 mm to 1 mm. For example, the average tip width can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The perforations may have an average hole width of from 0.01 mm to 1 mm. For example, the average hole width can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The perforations can have an average center-to-center pitch of from 0.1 mm to 50 mm. For example, the average center-to-center pitch can be greater than or equal to 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The perforations can be quadrangular in shape, for instance, square and rectangles. The perforations can have an average hole length to hole width ratio of from 0.1:1 to 1000:1. For example, the average length to width ratio can be greater than or equal to 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the holes can be triangular. Generally, the triangular holes will be equilateral triangles, with sides that are from 0.01 mm to 1 mm in length. For example, the average triangle side length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

In some embodiments, the holes can be substantially circular. Circular holes can have a diameter from about 0.05 to 1.0 mm. For example, the average hole diameter can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

In some embodiments, the porous membrane can be dimpled. Dimples can be similar to perforations in the manner they are disposed on the porous membrane, however, dimples are indentations, rather than complete voids, in the surface of the porous membrane. The thickness of the dimples can be from 1-99% the thickness of the porous membrane. For examples, the average thickness of the dimples can be less than 95%, 90%, 85%, 80%, 75%, 70%, 65%, 60%, 55%, 50%, 45%, 40%, 35%, 30%, 25%, 20%, 15%, 10%, or 5% that of the porous membrane. Dimples may be arranged in rows along the porous membrane. The rows or lines may be spaced 0.001 mm to 10 mm apart. For example, the rows can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart.

The dimples may have an average dimple length of from 0.05 mm to 1 mm. For example, the average dimple length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The dimples may have an average dimple width of from 0.01 mm to 1 mm. For example, the average dimple width can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The dimples can have an average center-to-center pitch of from 0.1 mm to 50 mm. For example, the average center-to-center pitch can be greater than or equal to 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The dimples can be quadrangular in shape, for instance, square and rectangles. The dimples can have an average dimple length to dimple width ratio of from 0.1:1 to 100:1. For example, the average length to base width ratio can be greater than or equal to 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the dimples can be substantially circular. Circular dimples can have a diameter from about 0.05 to 1.0 mm. For example, the average dimple diameter can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

In some embodiments, the porous membrane can feature a combination of serrations, holes, slits, and/or dimples. For instance, a porous membrane can have a series of serrated ribs running top to bottom along the separator, and a second series of serrated ribs running horizontally along the separator. In other embodiments, the porous membrane can have an alternating sequence of serrated ribs, dimples and/or perforations. Also, a pocket, sleeve or wrap separator may have openings or slits to allow acid movement.

In accordance with at least one embodiment, the porous membrane is made up of an ultrahigh molecular weight polyethylene (UHMWPE) mixed with a processing oil plus additive and precipitated silica. In accordance with at least one other embodiment, the porous membrane is made up of an ultrahigh molecular weight polyethylene (UHMWPE) mixed with a processing oil and precipitated silica. The processing oil can be optionally removed as described above. The additive can then be applied to the porous membrane via one or more of the techniques described above. In accordance with at least one particular embodiment, the negative cross ribs are rounded mini-ribs and preferably have a 2 to 6 mil radius and a 10 to 50 mil rib spacing.

In accordance with at least selected embodiments, the porous membrane includes a porous membrane having a backweb and optionally having one or more positive ribs and/or negative ribs thereon. For example, the porous membrane may include a porous membrane having a backweb and at least two positive ribs on the positive side of the backweb, and optionally a plurality of smaller negative cross ribs or transverse ribs on the negative side of the backweb. The positive ribs may be straight or wavy, may have a solid portion, may have a truncated pyramidal shape, may be serrated, battlemented, discontinuous, continuous, nubs, protrusions, or combinations thereof. The negative ribs may be smaller than the positive ribs and may be straight or wavy, may have a solid portion, may have a truncated pyramidal shape, may be serrated, battlemented, discontinuous, continuous, nubs, protrusions, mini-ribs, transverse, longitudinal, or combinations thereof. Also, the positive and negative face ribs may be the same size (the same size on both sides) and may be parallel, angled or perpendicular to each other. For example, both sides may have small or mini ribs and such ribs may be parallel, angled or perpendicular to each other. The membrane may be selected from the group of polyolefin, rubber, polyvinyl chloride, phenolic, cellulosic, or combinations thereof, and the membrane is preferably a polyolefin (PO) material, more preferably polyethylene (PE), forming a porous or microporous membrane for a battery separator for a storage battery.

In at least one embodiment, the porous membrane is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The porous membrane back web or sheet thickness may be approximately 0.10 to 0.50 mm, the height of the longitudinal ribs may be 0.3 to 2.0 mm and the height of the transverse ribs may be 0.1 to 0.7 mm, the longitudinal rigidity with 100 mm width may be approximately 5 mJ and the transverse rigidity may be approximately 2.5 mJ, and the total thickness of the porous membrane may be less than 3.5 mm, preferably less than 2.5 mm.

Coating Materials

The exemplary coating materials described herein can impart, for example, improved oxidation resistance, improved wettability, reduced black residue, improved surface conductivity, increased stiffness, and/or improved resistance to metal contamination induced oxidiation in the above-described porous membranes. The coating materials can increase charge acceptance and/or reduce acid stratification in batteries, especially lead acid batteries. In some embodiments, the coating material is hydrophilic, porous, conductive, oxidation resistant, or self-adhering to a porous membrane. In some selected embodiments, the coating material is hydrophilic and porous, or hydrophilic, porous, and oxidation resistance, or hydrophilic, porous, and conductive, or hydrophilic, porous, oxidation resistant and conductive, or any combination thereof.

Exemplary coating materials include, but are not limited to, silica, fumed silica, silicon oxides, alumina, aluminum oxides, metals, metal oxides, cellulose, carbon, and conductive carbon materials. In certain embodiments, the coating material is a single type of material, while in other embodiments, the coating material contains two or more of the above mentioned materials, for instance, silica and silicon oxides, alumina and aluminum oxide, silica and carbon, etc.

Exemplary metal oxides that may be present in the coating layer include aluminum oxide ($Al_2O_3$), boehmite γ-AlO(OH), silicon oxide, and oxides of transition metals and the like or mixtures thereof.

Exemplary conductive carbons include graphite, graphene, graphene oxides, carbon nanotubes, carbon fibers, or the like.

In certain selected embodiment, the coating layer may contain one of the foregoing materials in combination with a polymer, binder or carrier material. Exemplary carrier materials include glass mats, ceramics, and polymers. Exemplary polymers include polyolefins, PVDF, PVDF: HFP, PEO, PTFE, SBR, PVA, acrylic, and/or the like. In certain embodiments, the carrier mixture is blended homogenously with the foregoing materials, and in other embodiments, the materials are present as an agglomeration of particles.

The coating layer may be present on the face of the porous membrane facing the positive electrode, the face of the porous membrane facing the negative electrode, or both faces of the porous membrane. In certain embodiments, the face of the porous membrane that faces the positive electrode may be coated with one material, while the face of the porous membrane that faces the negative electrode may be coated with a different material. In other embodiments, both faces are coated or over-coated with the same material.

The coating layer or layers may be present on either side of the porous membrane, at a thickness of the range of 0.1 μm to 250 μm, possibly preferably of 1 to 250 μm, 1 to 150 μm, 2.5 to 150 μm, 2.5 to 125 μm, 2.5 to 100 μm, 2.5 to 75 μm, 5 to 75 μm, 5 to 100 μm, 10 to 100 μm, 5 to 50 μm, 5 to 25 μm, 25 to 100 μm, 25 to 50 μm, or 25 to 75 μm. In other embodiments, the coating may be applied at very thin thickness, for instance, less than 5 μm, 4 μm, 3 μm, 2 μm, 1 μm, 0.5 μm, or 0.25 μm. In other embodiments, the coating may be applied at thicker rate, for instance, more than 5 μm, 10 μm, 15 μm, 20 μm, 25 μm, 30 μm, 35 μm, 40 μm, 50 μm, 75 μm, 100 μm or 150 μm.

Coated Porous Membranes

The coated porous membranes described herein are preferably characterized by enhanced stiffness, oxidation resistance, wettability, and/or surface conductivity, resistance to contamination induced oxidation, reduced black residue, and/or the like.

Methods of Coating Porous Separators

In certain embodiments, the coating layer covers the entirety of the porous membrane, while in other embodiments, the coating covers a portion of the porous membrane, for instance, on the ribs, on the backweb, on the positive face, on the negative face, and/or in stripes, ribbons, other patterns, and/or the like. The substrate or membrane can be a flat PE membrane, a ribbed PE membrane, an AGM, or other substrate. When the coating layer is applied as ribs or stripes or other patterns, the preferred substrate or membrane may be substantially flat. The coating layer may be applied to a porous membrane (or to just the ribs) via a dip, knife, curtain, gravure, solvent coating, aqueous coating, physical vapor deposition method, an atomic layer deposition method, or a chemical vapor deposition method. Physical vapor deposition (PVD) may include a variety of vapor and/or vacuum deposition methods used to deposit thin films by the condensation of a vaporized form of the desired film material onto various substrate surfaces. PVD is used in the manufacture of various items, including, by way of example only, semiconductor devices, aluminized PET film for balloons and food packaging bags, and coated cutting tools for metalworking. Vacuum metallizing is a form of physical vapor deposition, a process of combining metal with a non-metallic substrate through evaporation. The most common metal used in vacuum metallization is aluminum for a variety of reasons such as cost, thermodynamics, and reflective properties.

In certain embodiments there are provided a very thin coating on a porous membrane. Such embodiments may be desirable because it occupies less volume in a battery and may enable a battery to have higher volumetric and gravimetric energy density.

In forming the coating layers described herein, a vapor deposition technology may be employed to deposit a very thin layer of a coating layer at an ultra-thin thickness of less than 1 μm. Physical vapor deposition (PVD), chemical vapor deposition (CVD) and atomic layer deposition (ALD) are three commonly known types of vapor deposition technology. Non-limiting examples of physical vapor deposition are sputter and evaporation. Physical vapor deposition may involve vaporizing a metallic element, a reactive metallic element, an inert metallic element, or a metal oxide and forming a layer on a substrate such as a porous membrane. A vapor deposition layer may be deposited onto a porous membrane, which vapor deposition layer is comprised of a single layer of individual atoms or molecules of highly oxidation resistant materials such as a metal and/or metal oxide. Furthermore, a vapor deposition layer may be deposited onto a porous membrane, which vapor deposition layer is comprised of multiple layers of individual atoms or molecules of highly oxidation resistant materials such as an inert metallic element, a reactive metallic element, or a metal oxide compound. In addition, one or more layers of possible combinations applied in various orders of a metal and/or metal oxide may be formed at a thickness of less than one μm, more preferably at a thickness of less than approximately 0.5 μm, more preferably less than approximately 1,000 Å, and most preferably at a thickness less than approximately 500 Å on a microporous membrane.

Atomic layer deposition (ALD) which is a film growth method that deposits a deposition in layers, may also be used to apply a coating layer in a controlled fashion. In general, a vapor of film precursor is absorbed on a substrate in a vacuum chamber. The vapor is then pumped from the chamber, leaving a thin layer of absorbed precursor, usually essentially a monolayer, on the substrate. A reactant is then introduced into the chamber under thermal conditions, which promote reaction with the absorbed precursor to form a layer of the desired material. The reaction products are pumped from the chamber. Subsequent layers of material can be formed by again exposing the substrate to the precursor vapor and repeating the deposition process. ALD can produce very thin films of nanometer range with extremely dense layer production and a minimum amount of defects.

Chemical vapor deposition (CVD) technology may also be used to apply a coating layer in a controlled fashion. Chemical vapor deposition is another widely used materials-processing technology to apply solid thin-films to surfaces.

It has been used to deposit a very wide range of materials. In its simplest incarnation, CVD involves flowing a precursor gas or gases into a chamber containing one or more heated objects onto which the CVD layer is to be applied. Chemical reactions occur on and near the hot surfaces, resulting in the deposition of a thin film on the surface. This is accompanied by the production of chemical by-products that are exhausted out of the chamber along with unreacted precursor gases. It can be done in hot-wall reactors and cold-wall reactors, at sub-torr total pressures to above-atmospheric pressures, with and without carrier gases, and at temperatures typically ranging from 200-1600° C. There are also a variety of enhanced CVD processes, which involve the use of plasmas, ions, photons, lasers, hot filaments, or combustion reactions to increase deposition rates and/or lower deposition temperatures.

Application of a deposition layer or layers using PVD, CVD or ALD may provide reliable methods to control the added thickness of a deposition of coating material. In certain selected embodiments, the thickness of the deposition layer or layers may be ultra-thin and in the range of less than approximately 5 μm, more preferably less than approximately 1 μm, more preferably less than approximately 1,000 Å, and most preferably at a thickness less than approximately 500 Å. Such a reliable method of applying an ultra-thin deposition at a thickness less than 1 μm may not be attained using, for example, other coating methods such as dip, gravure, knife, curtain, etc. coating methods. An application of an ultra-thin deposition using one or more of the PVD, CVD or ALD deposition methods may provide a reliable method to apply a uniform oxidation resistant layer. The level of application control achieved in PVD, CVD or ALD deposition methods may have sufficient accuracy so as to contribute an insignificant increase in thickness of a polymeric microporous membrane.

Such layers or coatings may be applied as a coating slurry or mixture or a layer onto one or both sides of a microporous battery separator membrane in order to, among other things, promote high temperature stability, reduce acid stratification, improve wettability, improve stiffness, reduce thermal shrinkage, control oxidation at the separator-positive electrode interface of the battery, and improve safety performance of the microporous battery separator membrane in a battery. Such coatings may be applied using known technologies such as, but not limited to, dip coating, knife, gravure, curtain, etc. and can be applied at a thickness of approximately 2 μm to 6 μm, 5 μm to 75 μm, and the like, or more, onto one or both sides of a microporous battery separator membrane.

In accordance with certain embodiments, polymeric and/or ceramic particle-containing polymeric coatings may be applied on top of or in addition to a metal and/or metal oxide deposition layer in order to further improve various properties of the separator, for example, the thermal stability of the separator membrane at high temperatures.

In accordance with certain embodiments, the battery separator membrane described herein is directed to a polymeric microporous membrane to which is applied a deposition layer comprising a highly oxidation resistant material such as an inert metallic element where the deposition layer thickness is in the range of approximately 20 Å to approximately 1 μm. Non-limiting examples of an inert metallic element may be gold and platinum. A deposition of a chemically stable metal such as gold or platinum onto a microporous polymeric membrane or film may create an oxidation resistant layer when the side of the microporous polymeric membrane bearing the deposition layer is placed in contact with the cathode. When a battery is a high voltage battery oxidation may be more aggressive, and a protective oxidation resistant layer is desirable to limit the oxidative degradation of the microporous polymeric membrane against the cathode. A metal deposition layer according to various embodiments herein is a conductive layer and may dissipate current distribution within a battery cell. In at least certain embodiments, the inventive metal conductive deposition layer described herein may be applied to a non-conductive layer or layers of a polymer, such as a polyolefin, such as, but not limited to, a polypropylene, a polypropylene blend, a polypropylene copolymer, or mixtures thereof and a polyethylene, a polyethylene blend, a polyethylene copolymer, or mixtures thereof. Non-limiting examples of the non-conductive layer may include single layer, bilayer, trilayer or multilayer (coextruded or laminated) porous membranes manufactured by a dry process or by a wet process, with added glass mats or other woven or nonwoven layers, which are commonly known by those skilled in the art.

In accordance with at least certain embodiments, examples of a reactive metal element may include aluminum (Al), which is a conductive metal. As an example of a reactive metal element, when exposed to oxygen in air, aluminum will form an ultra-thin protective layer of aluminum oxide ($Al_2O_3$). A layer of $Al_2O_3$ may be stable against further oxidation in air.

Figure 2:
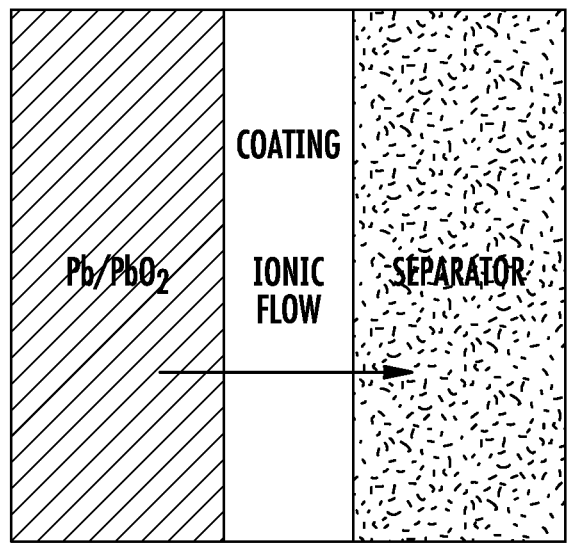
FIG. 2 is a schematic vertical cross-section view of a positive plate and an inventive functionalized separator with at least one functional coating, material, layer, or deposition on at least one side of a porous substrate, membrane or film, such as a microporous PE separator membrane or membrane separator.
Figure 3:
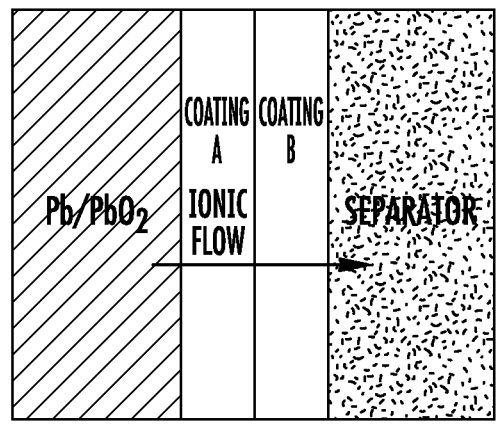
FIG. 3 is a schematic vertical cross-section view of a positive plate and another inventive functionalized separator with at least two functional coatings, layers, depositions, and/or materials on at least one side of a porous substrate, membrane or film, such as a microporous PE membrane separator. For example, Coating A may be carbon or alumina, and Coating B may be silica.
Figure 4:
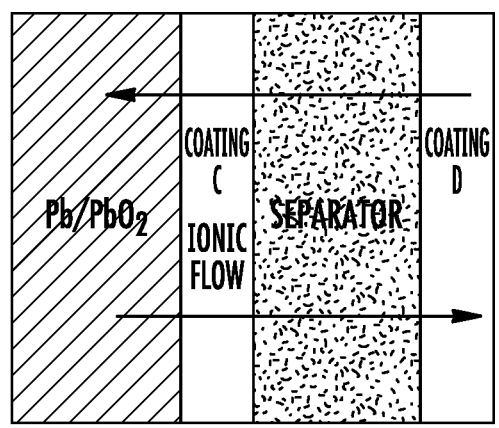
FIG. 4 is a schematic vertical cross-section view of a positive plate and yet another inventive functionalized separator with at least one functional coating, layer, deposition, and/or material on each side of a porous substrate, membrane or film, such as a microporous PE membrane separator. For example, Coating C may be carbon, silica or alumina, and Coating D may be carbon or silica.
Figure 6:
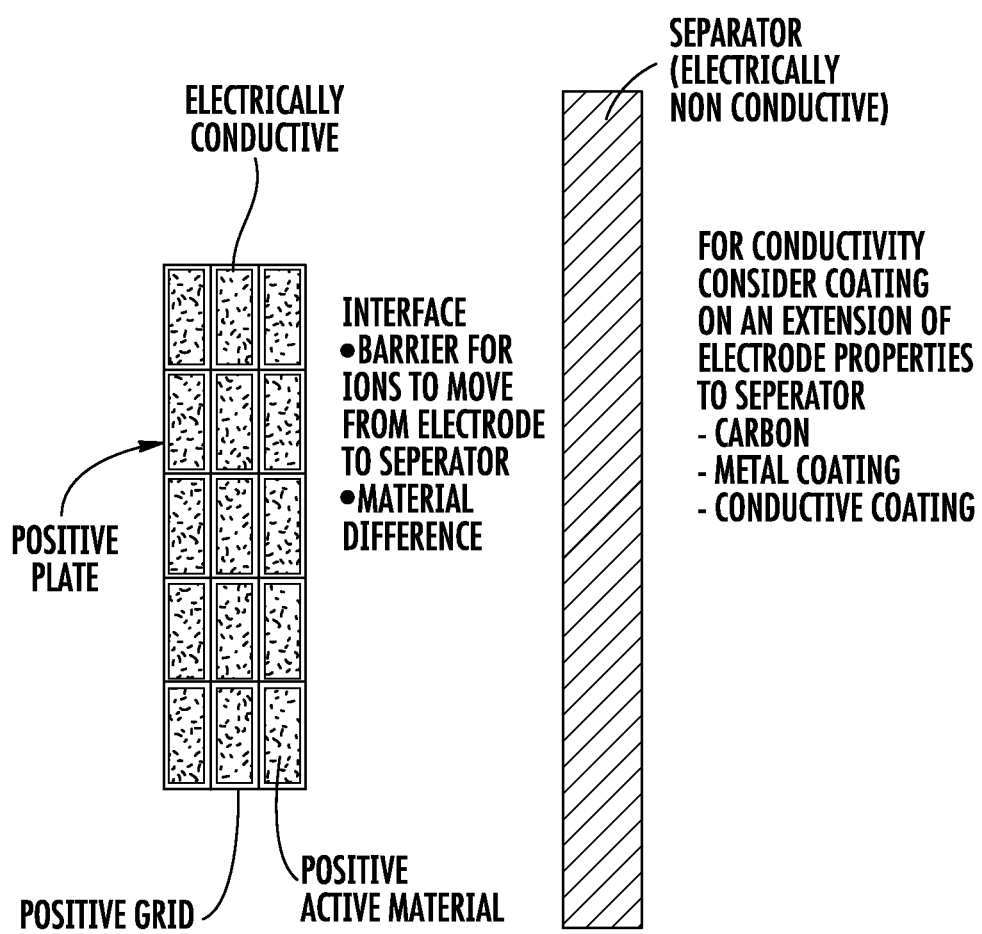
FIG. 6 is a schematic representation of a positive plate and a separator.
Figure 7:
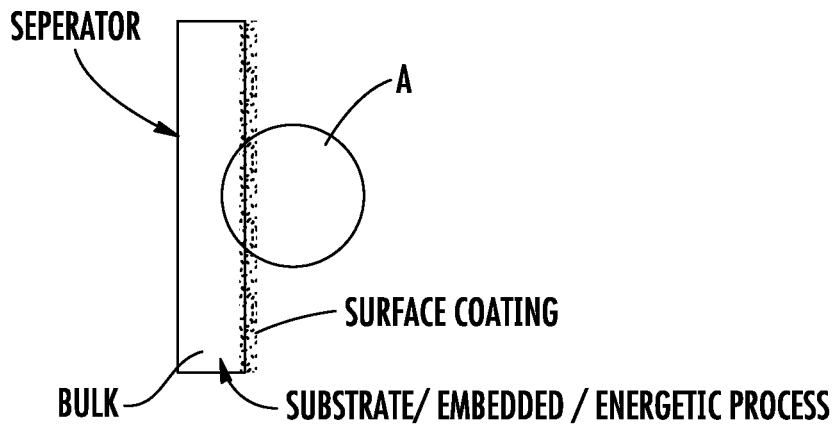
FIG. 7 is a schematic representation of an inventive coated or treated separator with a surface coating, layer or treatment on one side.
Figure 7A:
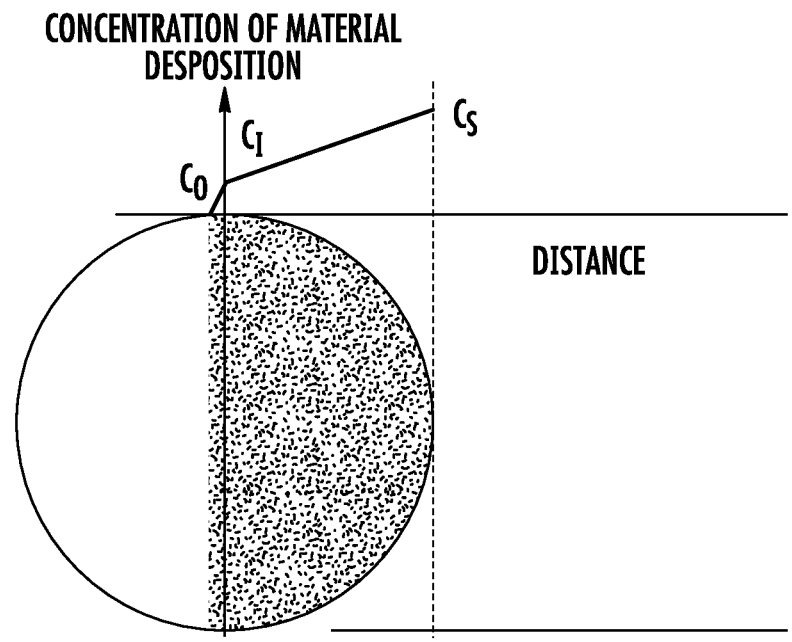
FIG. 7A is a schematic representation of an enlarged portion of FIG. 7 with an associated concentration graph showing the inventive coated or treated separator with a surface coating or treatment on one side with the coating or treatment material penetrating into the separator film or substrate and with a higher material concentration toward the outer surface of the coating, layer or treatment.

Various non-limiting examples may offer different property sets or improvements that may include one or any combination of the following:

1. One exemplary embodiment of a conductivity enhancement may provide carbon, which may be deposited by a variety of methods as described herein, or otherwise known in the art, on one or both sides of the separator.
2. Another exemplary embodiment may provide oxidation resistance by depositing alumina, silica, etc. by various methods as described herein or otherwise known in the art, on the positive side of the separator.
3. Yet another exemplary embodiment may provide black residue reduction by the use of less oil on one or both sides of the separator.
4. Still another exemplary embodiment may provide stiffness to the separator by depositing alumina, silica, etc. by various methods as described herein or otherwise known in the art, on one or both sides of the separator.
5. Another exemplary embodiment may address acid stratification by incorporating silica, fibers, glass fibers, cellulosic fibers etc. deposited by various methods and with a combination of materials as described herein on the positive side of the separator.
6. Another exemplary embodiment may include incorporating cellulosic coating which will provide resistance to oxidation induced by metal contaminants such as Cr, Mn, etc.
7. Further, another exemplary embodiment may incorporate a variety of geometries, such as by replacing rib alone by coating, cover glass fibers as coating, glass fibers, cellulosic fibers or mixture of fiber and silica, etc.
8. Still further, the exemplary embodiments provided in any one of FIGS. 2-4.
9. Yet further, the exemplary embodiments provided in any one of FIGS. 5A and 5B.
10. Still yet further, the exemplary embodiments provided in FIGS. 7 and 7A.

11. Fumed silica mixed with binder on positive side by roller coating, carbon on negative side by PVD.
12. Film of Cellulose with phenol-formaldehyde binder on positive side, carbon on negative side.

The range of stiffness of the separator may be measured by the resistance to bending, such as by an industry standard test or as specified in BSTE:2530. Oxidation stability may be measured by: 1) weight loss incurred in hot sulfuric acid containing peroxodisulfate (hydrogen peroxide); or 2) the Perox-80 test; or 3) by an industry standard test or as specified in BSTE-2100, 2100-3, and BSTE-2520. The range of wettability is measured in minutes (usually 3 minutes and 10 minutes) and can be measured by immersing the separator horizontally and measure the wettability with respect to time, such as by an industry standard test or as specified in BSTE:2540, and 2543. The range of surface conductivity may be measured by electrochemical impedance spectroscopy.

In accordance with at least selected embodiments, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments, the present application is directed to novel or improved microporous membranes, battery separator membranes, separators, energy storage devices, batteries including such separators, methods of making such membranes, separators, and/or batteries, and/or methods of using such membranes, separators and/or batteries. In accordance with at least certain selected embodiments, the present invention is directed to a separator for a battery which has an oxidation protective deposition layer or layers. The deposition layer is preferably a thin or ultra-thin deposition of conductive or insulating layers applied to a polymeric microporous membrane. Methods could use a binder that goes away upon post treatment or a solvent such as water that gets removed during post-process such as heating/curing/annealing, etc. Also, methods could use a binder that does not go away (the binder may remain or stay back) and holds the fibers or particles together in wet coatings. Another method includes a binder-free and solvent-free deposition method. By employing a deposition layer, the energy density of a battery may be increased. Furthermore, the deposition method may preferably deposit a uniform layer that is less than about 0.5 μm. In accordance with at least particular embodiments, the battery separator membrane described herein is directed to a multilayer or composite microporous membrane battery separator which may have excellent oxidation resistance and may be stable in a high voltage battery system up to. In accordance with at least other selected embodiments, the present invention is directed to a separator for a battery which has a conductive deposition layer which is stable in electrolyte and in the battery operating conditions.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

Improved battery separators are disclosed herein for use in various lead acid batteries. The improved separators disclosed herein provide lead acid batteries having substantially increased battery life, improved charge acceptance, improved oxidation resistance, improved surface conductivity, improved stiffness, improved wettability, and substantially reduced battery fail rate and acid stratification.

In accordance with at least selected embodiments, aspects or objects, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments, the present application is directed to novel or improved porous membranes having a coating layer, battery separator membranes having a coating layer, separators, energy storage devices, batteries, including lead acid batteries including such separators, methods of making such membranes, separators, and/or batteries, and/or methods of using such membranes, separators and/or batteries. The disclosed separators and batteries may have improved charge acceptance, improved surface conductivity, improved oxidation resistance, reduced acid stratification, reduced black residue, improved wettability, and/or improved stiffness.

In accordance with at least selected embodiments, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments, the present application is directed to novel or improved porous membranes having a coating layer, battery separator membranes having a coating layer, separators, energy storage devices, batteries, including lead acid batteries including such separators, methods of making such membranes, separators, and/or batteries, and/or methods of using such membranes, separators and/or batteries. The disclosed separators and batteries have improved charge acceptance, improved surface conductivity, improved oxidation resistance, reduced acid stratification, improved resistance to metal contamination induced oxidation, reduced black residue, improved wettability, and/or improved stiffness.

In accordance with at least certain selected embodiments, the present invention is directed to a separator for a battery that is a microporous polymer membrane functionalized, coated, treated, or the like to add at least one material, treatment, function, or layer on at least one side thereof. In certain selected particular embodiments, the material, treatment, function, or layer may or may not include a binder, may include one or more materials such as silica, silicon oxides, alumina, aluminum oxides, metals, metal oxides, conductive carbon materials, acid stabilized cellulose, and/or the like, and/or may include one or more conductive or dielectric or insulating layers.

In accordance with at least certain embodiments, a method of obtaining improved separators is provided in which a treatment, material or layer is applied to at least one surface or side of a polymeric microporous membrane, a polyethylene (PE) microporous membrane, a woven or nonwoven material, a nonwoven glass mat, a nonwoven absorptive glass mat (AGM), a nonwoven or woven PET, cellulose nonwoven mat, and/or the like. The material, treatment or layer can be applied by vapor deposition, chemical deposition, vacuum assisted methods, PVD, CVD, TD, DCD, PACVD, DLC, thin-film coating or deposition technology, nano-film technology, single atom thick coating technology, sol-gel, solvent coating, aqueous coating, and/or the like. In some embodiments the material, treatment, coating, layer, or function is applied or added by a solvent-free method, a binder-free method, or a solvent and binder free method. In other selected embodiments, the layer is applied in the presence of a binder and/or solvent which may be subsequently removed post-process.

In accordance with at least selected embodiments, a porous membrane with a porous or ionically conductive coating or layer is provided as a battery separator in a lead acid battery and may improve the cycle life, cranking ability and high charge acceptance of the battery.

In accordance with at least particular embodiments, the battery separators described herein are directed to a multi-layer or composite microporous membrane battery separator which may have excellent oxidation resistance and are stable in a lead acid battery system. In accordance with at least other selected embodiments, the present invention is directed to a battery separator having a layer which increases oxidation resistance, improved oxidation resistance in the presence of metal ion contamination such as chromium ions, reduces acid stratification, improves surface conductivity, improves charge acceptance, increases stiffness, runnability and processability, and/or increases surface wettability.

In accordance with at least selected embodiments, the present application or invention is directed to novel, improved or optimized porous films, membranes or substrates, functionalized, coated or treated porous films, membranes or substrates, novel, improved, optimized, functionalized, coated, or treated separator membranes, separators, multilayer separators, lead acid battery separators, or composites, electrochemical devices, batteries, or cells including such films, membranes, substrates, separator membranes, separators, lead acid battery separators, or composites, novel, improved or optimized combinations or systems of plates or electrodes with such films, membranes, substrates, separator membranes, separators, lead acid battery separators, or composites, methods of making such films, membranes, substrates, separator membranes, separators, lead acid battery separators, composites, systems, combinations, cells, devices, and/or batteries, and/or methods of using such films, membranes, substrates, separator membranes, separators, lead acid battery separators, composites, systems, combinations, cells, devices, and/or batteries. In accordance with at least certain embodiments, the present application is directed to novel, improved, or optimized, functionalized, coated, or treated microporous membranes, battery separator membranes, lead acid battery separator membranes, separators, and/or lead acid battery separators having at least one functionalized, coated, or treated surface on at least one side thereof, having at least one coating, film, layer, or material on at least one side, rib or surface thereof, energy storage devices, cells, systems, combinations, and/or batteries including such membranes, battery separator membranes, lead acid battery separator membranes, separators, and/or lead acid battery separators, methods of making such membranes, battery separator membranes, lead acid battery separator membranes, separators, and/or lead acid battery separators, and/or methods of using such membranes, battery separator membranes, lead acid battery separator membranes, separators, lead acid battery separators, composites, combinations, systems, devices, cells, and/or batteries, and/or the like.

The foregoing written description of structures, devices and methods have been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A lead acid battery separator comprising:
   a filled porous polyolefin membrane comprising a first surface;
   one or more of an absorbent glass mat (AGM), a glass mat, a pasting paper, a retainer mat, a gauntlet, or combinations thereof adjacent to said first surface; and,
   wherein at least one of said filled porous polyolefin membrane or said absorbent glass mat (AGM), glass mat, pasting paper, retainer mat, gauntlet, or combinations thereof has, therein and/or thereon, a metal oxide and a material that is conductive and/or semi-conductive.

2. The lead acid battery separator of claim 1, wherein said conductive or semi-conductive material comprises a form of carbon.

3. The lead acid battery separator of claim 1, wherein said filled porous polyolefin membrane is microporous.

4. The lead acid battery separator of claim 1, wherein said filled porous polyolefin membrane comprises ribs, cross-ribs, perforations, or dimples.

5. The lead acid battery separator of claim 1, wherein said metal oxide is at least one of the group consisting of aluminum oxide ($Al_2O_3$), boehmite (AlO(OH)), silicon oxide, oxides of transition metals, and combinations thereof.

6. The lead acid battery separator of claim 5, wherein said metal oxide is an oxide of transition metals, and the transition metal is zinc or titanium.

7. The lead acid battery separator of claim 1, wherein at least one of said filled porous polyolefin membrane or said absorbent glass mat (AGM), glass mat, pasting paper, retainer mat, gauntlet, or combinations thereof has therein and/or thereon a metal oxide and a material that is conductive.

8. The lead acid battery separator of claim 1, wherein at least one of said filled porous polyolefin membrane or said absorbent glass mat (AGM), glass mat, pasting paper, retainer mat, gauntlet, or combinations thereof has therein and/or thereon a metal oxide and a material that is semi-conductive.

9. The lead acid battery separator of claim 1, comprising the filled porous polyolefin membrane and a glass mat adjacent to said first surface of the filled porous polyolefin membrane, and wherein the glass mat has, therein and/or thereon, a metal oxide and a material that is conductive or semi-conductive.

10. The lead acid battery separator of claim 9, wherein said absorbent glass mat (AGM), glass mat, pasting paper, retainer mat, gauntlet, or combinations thereof has therein and/or thereon a metal oxide and a material that is semi-conductive or conductive, and faces a positive or negative electrode.

11. The lead acid battery separator of claim 10, wherein said absorbent glass mat (AGM), glass mat, pasting paper, retainer mat, gauntlet, or combinations thereof faces a positive electrode.

12. The lead acid battery separator of claim 10, wherein said absorbent glass mat (AGM), glass mat, pasting paper, retainer mat, gauntlet, or combinations thereof faces a negative electrode.

13. A lead acid battery comprising the separator of claim 1.

14. A lead acid battery comprising the battery separator of claim 1, wherein the filled porous polyolefin membrane has therein and/or thereon a metal oxide and a material that is semi-conductive or conductive, and faces a positive or negative electrode.

15. The lead acid battery of claim 14, wherein the filled polyolefin membrane faces the negative electrode.

16. The lead acid battery of claim 14, wherein the filled polyolefin membrane faces a positive electrode.

* * * * *